United States Patent [19]
Goto et al.

[11] Patent Number: 5,433,999
[45] Date of Patent: Jul. 18, 1995

[54] MAGNETIC RECORDING MEDIUM COMPRISING SPECIFIC BACKCOAT LAYER

[75] Inventors: Yoshiki Goto, Kitakatsuragi; Yukihiro Shimasaki, Sanda; Kazuyoshi Honda, Takatsuki; Tatsuaki Ishida, Sakai; Kiyokazu Tohma; Ryuji Sugita, both of Hirakata; Yasuhiro Kawawake, Suita, all of Japan

[73] Assignee: Matsushita Electric Industrial Co., Ltd., Kadoma, Japan

[21] Appl. No.: 128,075

[22] Filed: Sep. 29, 1993

Related U.S. Application Data

[63] Continuation of Ser. No. 725,074, Jul. 3, 1991, abandoned.

[30] Foreign Application Priority Data

| Jul. 5, 1990 | [JP] | Japan | 2-177710 |
| Sep. 4, 1990 | [JP] | Japan | 2-234885 |
| Jan. 31, 1991 | [JP] | Japan | 3-10639 |

[51] Int. Cl.⁶ .................................. B32B 5/16
[52] U.S. Cl. .......................... 428/329; 428/694 TB; 428/900
[58] Field of Search ............... 428/694 TB, 900, 329

[56] References Cited

U.S. PATENT DOCUMENTS

| 4,328,935 | 5/1982 | Steel | 428/329 X |
| 4,600,638 | 7/1986 | Ishikuro et al. | 428/323 |
| 4,784,907 | 11/1988 | Matsufuji et al. | 428/328 |
| 4,789,583 | 12/1988 | Akutsu | 428/143 |
| 5,039,554 | 8/1991 | Ishikuro et al. | 428/323 |
| 5,084,336 | 1/1992 | Kenpo et al. | 428/323 |
| 5,094,916 | 3/1992 | Sasaki et al. | 428/425.9 |

FOREIGN PATENT DOCUMENTS

| 0312074 | 4/1989 | European Pat. Off. |
| 9004311 | 6/1990 | Rep. of Korea |

OTHER PUBLICATIONS

Derwent Publication, London Database Wpil, Accession No. 91-205323, Jun. 20, 1990.
"Fibers, Optical to Hydrogenation", Encyclopedia of Polymer Science and Engineering, 1985 vol. 7, pp. 535-542.
Patent Abstracts of Japan, vol. 13, No. 428 (p. 936) 25 Sep. 1989, and JPA 01-159828 (Konica Corp.) 22 Jun. 1989 and KR 9004311 Abstract.

Primary Examiner—D. S. Nakarani
Assistant Examiner—H. Thi Lê
Attorney, Agent, or Firm—Cushman, Darby & Cushman

[57] ABSTRACT

In a magnetic recording medium with a back coat layer including polyurethane having a Tg (glass-transition temperature) below room temperature, isocyanate hardener, carbon powder and inorganic abrasive pigment are formed on a face of a non-magnetic substrate opposite a face covered by a magnetic recording film. Using this back coat layer, improved post contact characteristics and the like are obtained and smooth running conditions under small tensions are realized. Further, the magnetic recording medium causes only a small amount of head wear, and the medium has improved wear resistance.

6 Claims, 15 Drawing Sheets

MAGNETIC RECORDING MEDIUM COMPRISING SPECIFIC BACKCOAT LAYER

This is a continuation of application Ser. No. 07/725,074, filed on Jul. 3, 1991, now abandoned.

BACKGROUND OF THE INVENTION

1. Field of the Invention

The present invention relates to a magnetic recording medium having a high recording density which is applicable to various devices in the information industry.

2. Description of the Related Art

A coated type magnetic recording medium (which consists of a coating of uniformly dispersed, powdered ferromagnetic material such as $\gamma\text{-}Fe_2O_3$, $Co\text{-}\gamma Fe_2O_3$ or $CrO_2$ in an organic binder on a non-magnetic substrate) has been used as a magnetic recording medium (e.g., a magnetic flexible disk, magnetic tape etc.). Now, in order to make a high density recording, a thin metal film type magnetic recording medium has been investigated as a replacement for the coated type magnetic recording medium. In the thin metal film type magnetic recording medium, a magnetic recording metal film is directly formed on a non-magnetic substrate by a plating method, a sputtering method, a vacuum deposition method, an ion plating method or the like.

When the thin metal film type magnetic recording medium is actually used, smooth runability is not obtained and results in an extremely unstable signal in recording and reproducing. The reason is that large frictional forces between the bare back face (i.e., the opposite face of the substrate to the face coated by the magnetic recording metal film) of the non-magnetic substrate and guides or posts. Thus, in actual use of the thin metal film type magnetic recording medium, a back coat layer having a low and stable coefficient of friction and having a strong wear resistance is necessary, and it is important to maintain these characteristics under bad environmental conditions in practice.

Examples of the back coat layer made of vinylchloride group or vinylacetate group are shown, for instance, in U.S. Pat. Nos. 4,567,083, 4,587,150, 4,618,535, 4,628,009, 4,639,389, 4,663,217, 4,673,622, 4,592,942, 4,618,535, 4,448,847, 4,789,583 and U.S. Pat. No. 4,786,557.

Examples of the same made of a polyester group or an acrylic group are shown, for instance, in U.S. Pat. Nos. 4,687,699, 4,637,963 and U.S. Pat. No. 4,443,514. Examples of the same made of a polyurethane group are shown, for instance, in U.S. Pat. Nos. 4,567,063, 4,612,244, 4,612,235 and U.S. Pat. No. 4,587,150.

These conventional back coat layer products showed improved runability, but undesirable exfoliation in running was observed. Thus, there were problems such as: wear resistance was insufficient, there was an undesirable transfer of component in the back coat layer onto the magnetic recording film and there was an undesirable transcription of shape of the back coat film surface onto the magnetic recording film surface.

SUMMARY OF THE INVENTION

The present invention is intended to solve the above-mentioned problems. The purpose of the present invention is to provide a magnetic recording medium having improved stability in running, improved durability, non-transfer of component and no-transcription of shape and to provide a method for making it.

These objects are accomplished by a magnetic recording medium comprising:
 a non-magnetic substrate;
 a magnetic recording film formed on one face of the non-magnetic substrate; and
 a back coat layer formed on an opposite face of the non-magnetic substrate to a face covered by the magnetic recording film, the back coat layer comprising polyurethane having a Tg (glass-transition temperature) below room temperature, isocyanate hardener, carbon powder and inorganic abrasive pigment.

Owing to the back coat layer, an improved characteristic of contact with post and the like was obtained so that a smooth running condition under small tension was realized, and a magnetic recording medium having small head wear and improved wear resistance was obtained. The magnetic recording medium having stable runability and improved wear resistance was realized. Further, the magnetic recording medium of the present invention has a flat shape which is improved in its correction of curl.

According to the method for forming the magnetic recording medium of the present invention, a magnetic recording medium having good surface smoothness, enlarged Young's modulus and good runability was realized, since the coating material including polyurethane as a main component and having a suitable mixing ratio of components was applied. Additionally, more improved magnetic recording media having more smooth surfaces and no transcription of shape were obtained, owing to a filtration process and a most suitable coating condition.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Figure 1:
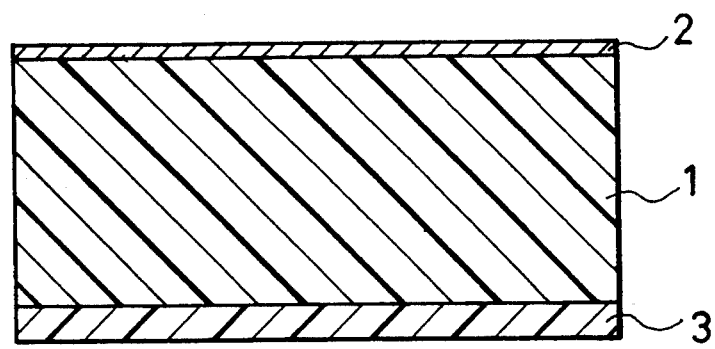
FIG. 1 is a cross-sectional view of a magnetic recording medium of the present invention.

The present invention is elucidated in detail with reference to the accompanying drawings. FIG. 1 is a cross-sectional view of a magnetic recording medium of the present invention. A magnetic recording film 2 is formed on one face of non-magnetic substrate 1, a back coat layer 3 is formed on an opposite face of the non-magnetic substrate 1 to the face covered by the magnetic recording film 2.

Suitable film, sheet or the like for the non-magnetic substrate 1 used in the magnetic recording medium of the present invention is made by selecting at least one material from the following known substances: high polymers such as polyamide, polyimide, polysulfone, polycarbonate, polypropylene, polyethylene, polyethylene terephthalate, polyethylene naphthalate, polycellulose acetate, polyvinyl chloride and the like; non-magnetic metal; ceramics such as glass, porcelain and the like.

Suitable ferromagnetic materials for forming the magnetic recording film 2 are as follows: at least one metal selected from Co, Ni and Fe, an alloy thereof with Cr, Mn, Ti, P, Y, Sm, Bi and the like or an alloy with an oxide of the same. Among these materials, at least two elements selected from Co, Cr and Ni are preferable for composing the magnetic recording film, since the composition has a high magnetic anisotrophy energy and a high saturated magnetization. The magnetic recording film is formed by the following known methods: a vapor deposition, a sputtering, an ion plating, a plating or the like. The magnetic recording film of the alloy of Co and Cr or an oxide of the same is more preferable in actual use owing to its high corrosion resistance. The magnetic recording film 2 used in the present invention can be made from other materials as mentioned above.

The back coat layer 3 in the present invention includes the following materials:

Main Agent of Polyurethane

Material for the main agent of polyurethane which has an average molecular weight above 10,000 can be used as binder component. Since a thin metal magnetic recording film of Co, Cr or the like has a mechanical feature which is different from that of the non-magnetic substrate, it is necessary to select a material for the main agent of polyurethane in consideration of suppressions of the following three problems: undesirable curling of the substrate, undesirable transfer of component in the back coat layer onto the magnetic recording film and undesirable transcription of shape of the back coat film surface onto the same. Suitable material for the main agent of polyurethane is a material having a high molecular weight and having a glass-transition temperature (hereinafter abbreviated to Tg) below room temperature. A preferable average molecular weight of the material is above 30,000.

A preferable value of Tg is about 10° C. The most preferable average molecular weight of the material is about 50,000 in consideration of Young's modulus, thickness and wear resistance of the back coat film. In forming the binder, it is possible to control the Tg of the whole urethane by adjusting an added amount of low molecular weight polyurethane having a high Tg above 60° C. to main agent of polyurethane having a Tg of about 10° C.

In order to improve mechanical properties such as Young's modulus and high glossiness, a high polymer, e.g., nitrocellulose, is added. In the present invention, nitrocellulose is added as a mixture of materials of nitrocellulose having different molecular weights. A copolymer of nitrocellulose with other material is also usable.

Hardener

A product of the isocyanate group having three functional groups which is made of trismethylolpropane and tolylenediisocyanate is usable as a hardener.

Carbon Powder

Carbon powder is used to obtain electric conductivity and to improve runability. The amount of the carbon powder is controlled to obtain a suitable electric conductivity in the range of from $10^{10}\Omega/cm^2$–$10^6\Omega/cm^2$, and the range of the electric conductivity is determined by the metal component used in the magnetic recording film. The diameter of the carbon particles in the carbon powder is selected for easy dispersion in liquid and for effective runability.

In the present invention it is preferable to use a mixture of both very fine carbon particles (a) and coarse carbon particles (b). The very fine carbon particles (a) have an average particle diameter of about 0.02 $\mu m$ and the diameter of coarse carbon particles (b) is larger than about 0.3 $\mu m$. Thus, electric conductivity owing to the very fine carbon particles (a) and obtainment of runability owing to the coarse carbon particles (b) are obtained.

In order to improve runability more, it is preferable to add carbon particles (c) having different diameters from the carbon particles (a) and (b) for obtaining a coarse surface of the back coat layer, and the average particle diameter of the carbon particles (c) is preferably below 1.0 $\mu m$ for a thin thickness of the back coat film.

A surface modification against the carbon powder is effective for improvement of dispersion and runability, and a surface treatment such as a dechlorination is effective for improvement of corrosion resistance. It is possible to use the above-mentioned carbon powder after the surface modification or the surface treatment. These particles after the surface modification or the surface treatment contribute to inside hardening of the back coat layer.

Inorganic Abrasive

Suitable material for inorganic abrasive pigment is as follows: at least one in the free state selected from aluminum, titanium and silicon, an oxide thereof or a mixture thereof with oxidized cobalt, chromium or iron.

Suitable material as the inorganic abrasive pigment having suitable diameter is selected to keep sufficient wear resistance against posts, guides and the like which the back coat layer makes direct contact with in running. Further, the inorganic abrasive pigment gives surface glossiness to the back coat layer.

Lubricant

It is preferable to add a lubricant, since runability is improved owing to the lubricant. A suitable lubricant may be a compound of a higher hydrocarbon or a compound of a fluoro hydrocarbon, which has a polar group such as a fatty acid, a salt thereof, an ester thereof, an amido thereof or an alcohol thereof at its end. It is possible to mix perfluoropolyether in its liquid phase only, an organic lubricant of the molybdenum group only or a combination thereof with the above-mentioned compound. The amount of the (added) lubricant should be determined for sufficient dispersion of solution, degree of improvement for runability and undesirable transfer of component in the back coat layer onto the magnetic recording film. It is preferably less than 1% by weight.

Additive

It is possible to add a first additive for promotion of hardening and/or a second one for improvement of dispersion. A suitable first additive is as follows: alkylthiol, alkylamine or a silane coupling agent of the alkyl group having an epoxy group or carboxylic acid, which has a small number of carbon atoms. A suitable second additive is a dispersant such as lecithin.

A thickness of the back coat layer changes according to the total thickness of the magnetic recording medium. When the manufacturing can be carried out, there is no limitation of the thinness of the back coat layer as long as influential transcription of shape does not occur. Through our experiment, when a thickness of the back coat film was in the range of less than 1.0 $\mu$m, unusual transcription due of shape onto the magnetic recording film surface due to the carbon powder and inorganic abrasive pigment was not observed. Thus, a back coat film having a thickness less than 1.0 $\mu$m was suitable for undesirable transcription of shape. Additionally, when the thickness of the back coat film is less than 0.15 $\mu$m, electric conductivity is reduced above $10^{10} \Omega/cm^2$. Thus, the thickness of the back coat layer is preferably thicker than 0.15 $\mu$m.

In a method for making a magnetic recording medium, it is important that all steps should be carried out in accordance with specifics and that the production rate should be made constant.

The present invention proposes a method for making a magnetic recording medium having following processes:
  a process for forming a magnetic thin film on one face of a non-magnetic substrate; and
  a process for forming a back coat layer on an opposite face of the non-magnetic substrate to the face covered by the magnetic thin film.

The back coat layer is formed by applying a coating material for the back coat layer including:
  polyurethane having a Tg below room temperature;
  isocyanate hardener;
  carbon powder;
  inorganic abrasive; and
  solvent.

In order to utilize the features of each material, preparation of the coating material for the back coat layer and the most suitable coating conditions for the coating material are necessary.

In preparation of the coating material, some problems may arise such that mixing of the materials are not to make suitable diameter in accordance with the specifics or exposure of carbon particles and/or inorganic abrasive pigment during hardening process occur frequently. These problems apparently result in worsened runability, electric conductivity and degree of hardening. Undesirable transfer, transcription and/or adhesion onto the magnetic recording film surface occur.

Conditions for coating, such as types of a gravure roll, rotating speed thereof, pressure of a blade, applying speed, control of temperature for drying and the like, have a large influence upon the finished surface of the back coat layer.

Owing to both contrivances in the preparation of the coating material and in a suitable coating condition of the same, uniformity and smoothness of the finished surface of the back coat layer are obtainable in spite of a wide area surface. An improved magnetic recording medium is obtainable where transcription of shape has little influence on the magnetic recording film and a flat envelope of signal in recording and reproducing is obtained.

Some contrivances made in preparing coating materials are selections of suitable proportions of each component of coating material and suitable filtration.

Suitable proportions of each component are as follows:

| | |
|---|---|
| Polyurethane | 2–3% by weight |
| Isocyanate hardener | 2–3.5% by weight |
| Methyl ethyl ketone | 15–18% by weight |
| Toluene | 24–30 wt % and |
| Cyclohexane | 3–5 wt %. |

Owing to the above-mentioned proportions, the coating material has a suitable viscosity for coating and brings with it enough inside hardening of the back coat layer. The elevation of the boiling point owing to a mixed solvent results in a low volatile coating material.

Somehow, conventional mixing of carbon powder and abrasive pigment within respective specified ranges of each sometimes results in a mixture including particles of unusual diameter, and may to undesirable projections on the surface of the back coat layer. We have found that the coating material after filtration results in a mixture including no particles having unusual diameters.

Thus, the coating material necessitates filtration, wherein it is important to select a suitable filter medium and to determine suitable conditions of filtration.

Suitable filter media should have such a performance (feature) that particles which pass through the filter have an average particle diameter of 0.4 $\mu$m and a maximum diameter of 1.0 $\mu$m. Suitable conditions of filtration are as follows:
Pressure of filtration ... less than 2 kg/cm$^2$ Period for filtration ... more than 60 minutes*
* wherein the filtrating rate of the coating material is about 1000 g/min.

Owing to the above-mentioned filtration, a smooth surface of the back coat layer is obtained, whereon no particle having an unusual diameter and no projections of particles are observed. There is no influence owing to transcription of shape of the back coat layer onto the magnetic recording film.

Figure 2:
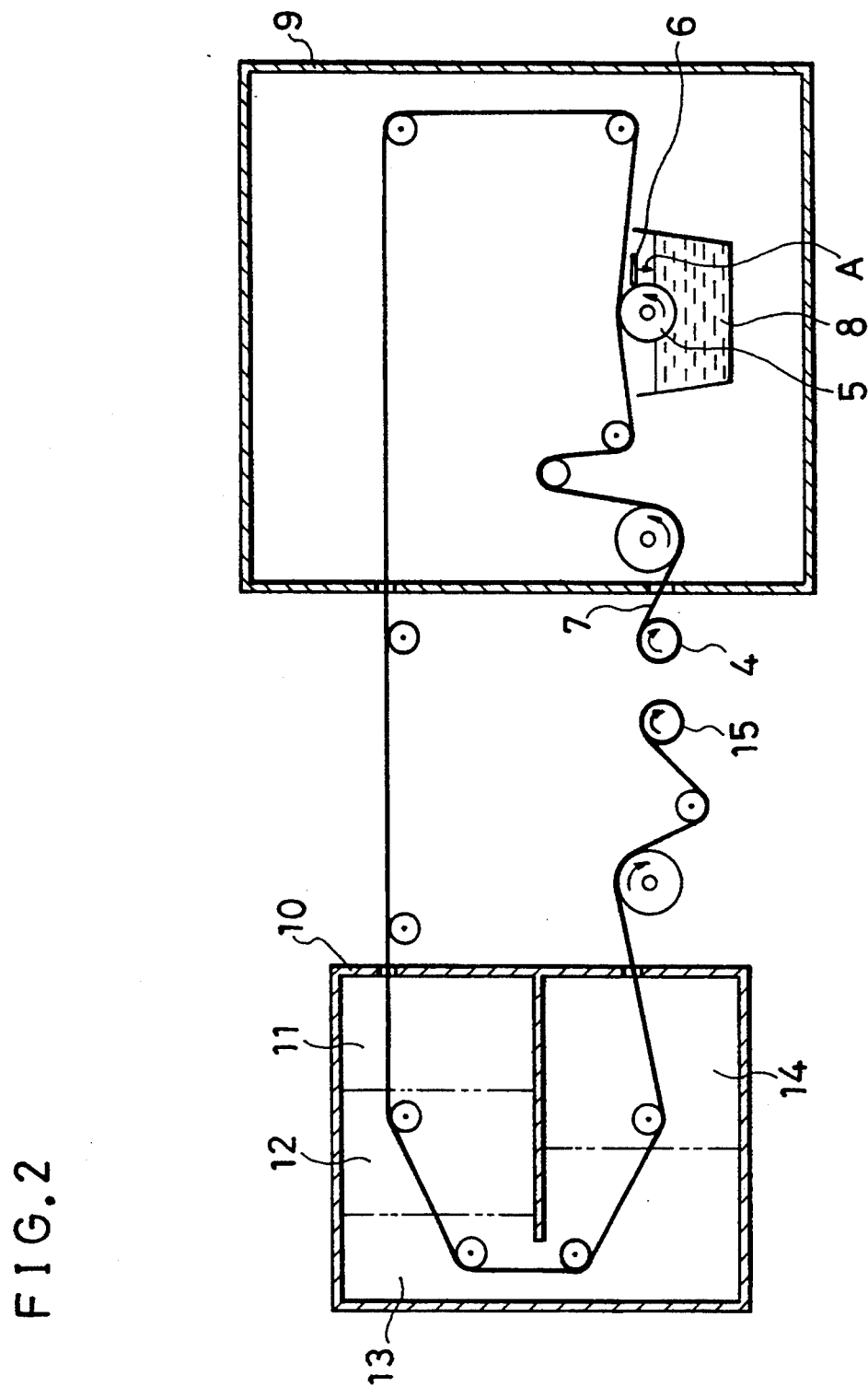
FIG. 2 is a flow diagram showing a gravure coating process for forming a back coat layer.
Figure 3:
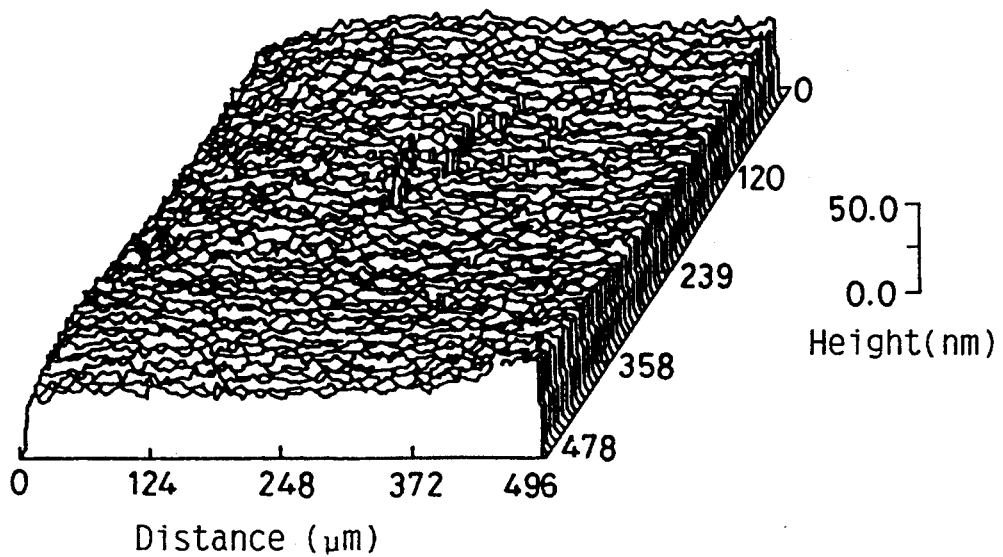
FIGS. 3, 4, 5, 6, 7 and 8 are enlarged perspective views (with 100×magnification) of the back coat layer of respective Comparison examples 8-1, 8-2 and 8-3, Examples 8-1 and 8-2 and Comparison example 8-4 which were obtained by a surface roughness meter.
Figure 4:
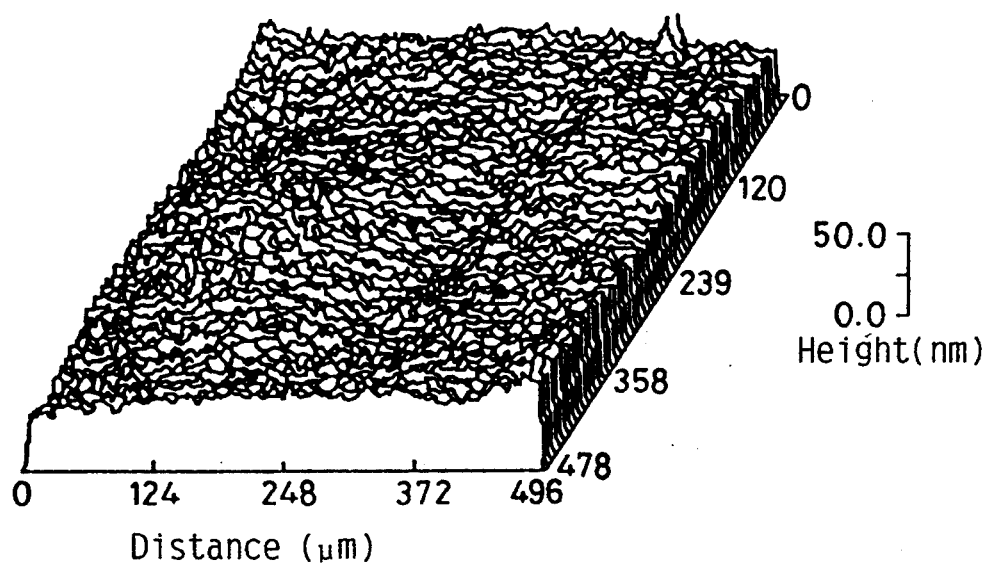
Figure 5:
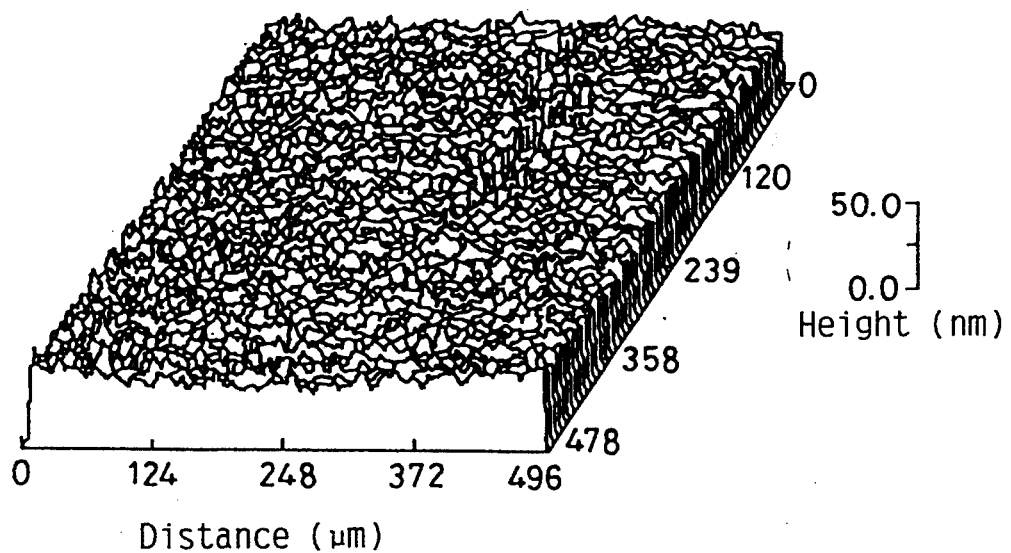
Figure 6:
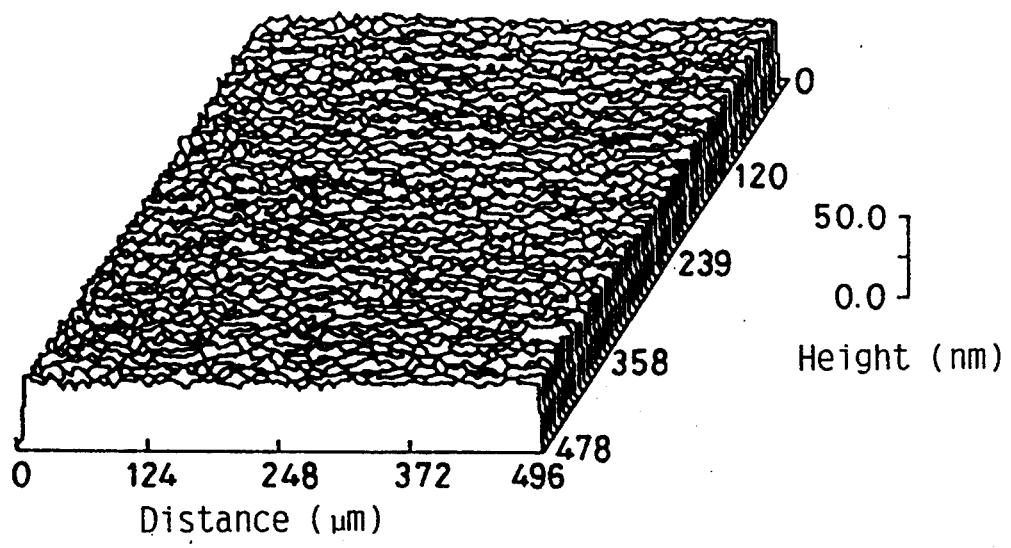
Figure 7:
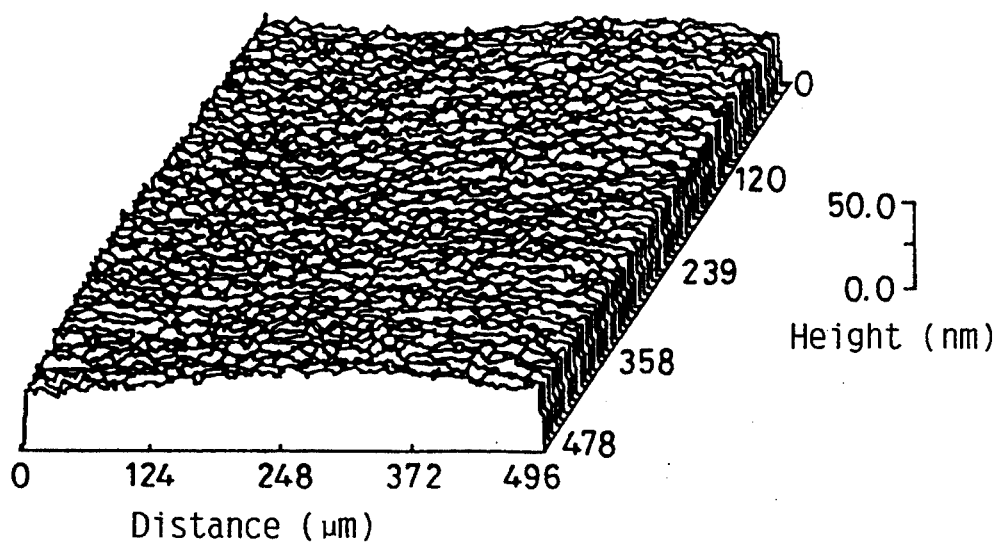
Figure 8:
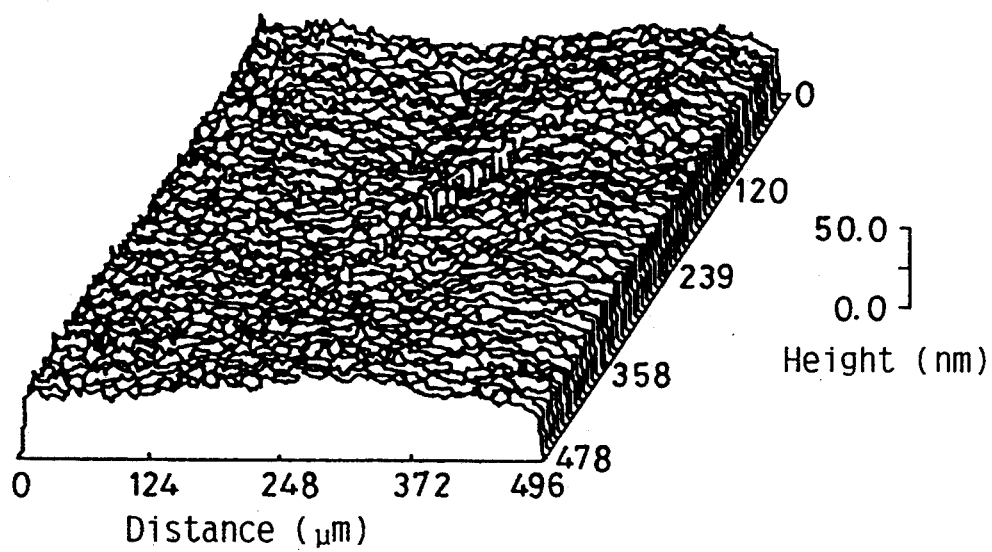

Suitable coating conditions for forming a back coat layer have been found through our experiment. FIG. 2 shows a gravure coating process for forming a back coat layer used in the present invention. The gravure coating process has a coating material transfer process and a drying process.

In FIG. 2, the coating material transfer process is carried out in a coating room 9, and the drying process is carried out in a drying room 10. The non-magnetic substrate whose face is covered by the magnetic recording film (abbreviated tape 7) is rolled on a supplying reel 4. The tape 7 is fed out and transferred on the gravure roll 5, whereon a coating material for the back coat layer 8 is applied on the opposite face of the non-magnetic substrate to the one covered by the magnetic recording film through rotating gravure roll 5.

A blade 6 holds down the gravure roll 5 as shown by an arrow A for controlling the amount of the coating material which sticks to the surface of the gravure roll 5. That is, a pressure toward the arrow A is applied to the gravure roll 5 by the blade 6, and hereinafter, it is abbreviated to a pressure of the blade. The immersion depth of the gravure roll is defined by the part of the gravure roll 5 which is immersed in the coating material 8.

The tape 7 is drawn into the drying room 10. The drying room 10 is divided into four portions (i.e., first 11, second 12, third 13 and fourth 14). In the actual drying room 10, there was no actual wall or the like for dividing these portions 11, 12, 13 and 14, but in each portion, a heater and a controller (including an electric thermometer) therefor is used in order to keep a constant temperature in that portion of the room. The set of a heater and a controller is not shown in FIG. 2. Control of temperature for drying is made by setting the temperature in each portion. Dried tape 7 is wound up by a winding reel 15.

In the transcription process, it is necessary to adjust the following parameters suitably:
Pressure of the blade 6,
Depth of the gravure roll 5,
Rotating speed of the gravure roll 5,
Tape speed and
Temperature for drying.

In case the coating condition of the transcription process is not suitable, the back coat layer has a striped pattern and/or thickness of the same becomes unequal and, it does not satisfy the desirable characteristics. It is necessary to select such a temperature for drying that a minutely finished surface of the back coat layer is obtainable owing to rapid volatility of solvent in the hardening process of the back coat layer, as far as there occurs no damage of the magnetic recording film.

Only after having made sufficiently such studies as have been mentioned, a back coat layer having improved features for practical use is obtainable. The best mode method for making the back coat layer is described hereafter.

A part from the back coat layer of the magnetic recording medium described in the present invention, the present invention is applicable to a magnetic recording medium which has a magnetic recording film having a protection layer and/or lubricant layer as a matter of course.

Detailed elucidation as to concrete examples has been made hereafter.

EXPERIMENT 1

Example 1—1

Tape samples of Example 1—1 were made by the following procedure:

STEP(a): Co-Cr (Co:Cr=8:2 in ratio of atoms) was deposited on one face of a 9 μm thick polyimide film (having 150 mm width) as the non-magnetic substrate 1 by a continuous vapor deposition method to form a 1600 Å thick Co-Cr film as the magnetic recording film 2, and the thickness of the Co-Cr film was determined by an SEM (Scanning Electron Microscope);

STEP(b): A coating material for the back coat layer was prepared by the mixing and dispersion of the following materials;

| | |
|---|---|
| (1) Polyurethane (Mw*[1]: 50,000) | 36.0 parts*[2] |
| (2) Nitrocellulose | |
| (2.1) Nitrocellulose having low molecular weight (Index of average molecular weight of 1/16 sec*[3]) | 25.5 parts |
| (2.2) Nitrocellulose having high molecular weight (Index of average molecular weight of ½ sec*[3]) | 10.6 parts |
| (3) Carbon black | |
| (3.1) Carbon black (a) (Average particle diameter: 0.023 μm) | 85.0 parts |
| (3.2) Carbon black (b) (Average particle diameter: 0.3 μm) | 0.5 parts |
| (4) Abrasive pigment ($CoAl_2O_3$) (Average particle diameter 0.045μ) | 4.2 parts |
| (5) Isocyanate hardener | 14.4 parts |
| (6) Stearic acid | 2.0 parts |
| (7) Methyl ethyl ketone | 65.0 parts |
| (8) Toluene | 105.2 parts |
| (9) Cyclohexane | 13.3 parts; |

*[1]Hereinafter weight average molecular weight is abbreviated to Mw.
*[2]Hereinafter parts of components are all by weight.
*[3]Hereinafter the index of average molecular weight of nitrocellulose was measured in conformity to JIS (Japanese Industrial Standard) K 6721.

STEP(c): The coating material for the back coat layer was applied on an opposite face of the polyimide film to the face deposited with the magnetic recording film and dried to form a 0.4 μm thick back coat layer with the use of the gravure coating process shown in FIG. 2 under the following conditions:

| | |
|---|---|
| (1) Gravure mesh | #150*[1] |
| (2) Rotation speed of the gravure roll | 100 rpm |
| (3) Tape speed | 5 m/min |
| (4) Temperature for drying | 110–120° C.; and |

*[1]Hereinafter, this means that gaps at a spacing density of 150 per 1 inch are graved.

STEP(d): The applied film was slit to give tape samples (8 mm width, 3 m length).

Comparison Example 1

Tape samples of this Comparison example 1—1 were made by the same steps as that of Example 1—1 except for omission of STEP(b) and STEP(c), hence omission of forming the back coat layer.

The following evaluation test for running characteristics was made on different tape samples obtained in the foregoing example and comparison example.

Dynamic Frictional Coefficient ($\mu k$) by Sailing Method

Fifty transits by each tape sample were made by a known sailing instrument having strain meters. Measurements of the dynamic frictional coefficient (hereinafter it is abbreviated (μk) were made at a first transit and after repeating 50 transits, and the surface of each tape sample was observed. One transit means one round-trip of the tape. Conditions relating to running by the sailing instrument are as follows:

The tape sample was wound on and around a post (4φ×25 mm length) made of SUS303-stainless steel (having a mean surface roughness of Ra 0.2S) at a winding angle of 180°; the tension was 10–40 gf; and the running speed was 18 mm/min.

Table 1 shows results of the evaluation test.

TABLE 1

| Example | μk | |
|---|---|---|
| | 1st Transit | After Repeating 50 Transits |
| Example 1 | 0.15 | 0.16 |
| Comparison Example 1-1 | 0.3 | 0.68 |

As shown in Table 1, in the magnetic recording medium having no back coat layer, as the number of transit became large, the value of μk became large.

In contrast, the magnetic recording medium of Example 1—1 embodying the present invention showed smooth runability at the first transit, and the smooth runability was deteriorated even after repeating 50 transits so that it showed improved wear resistance wherein undesirable exfoliation does not occur.

Thus, it was understood that the magnetic recording medium of the present invention having improved runability was obtained by applying the back coat layer on opposite face of the non-magnetic substrate to the one face covered by the magnetic recording film of Co-Cr, and that the back coat layer includes polyurethane, isocyanate hardening, carbon powder and inorganic abrasive.

EXPERIMENT 2

Examples 2-1, 2-2 and 2-3 and Comparison Examples 2-1, 2-2 and 2-3

Many examples and comparison examples were formed by using a plural kinds of urethane having different average molecular weights and Tg. There is a relationship between average molecular weight and Tg. That is, the larger the average molecular weight becomes, the lower the Tg becomes. These examples and comparison examples were formed in the same way as that of Example 1—1 except that the thickness of the back coat layer was 0.3 μm. The magnetic recording film surface of each tape samples was observed.

The result of observation was defined as follows:
(i) Convexity: The magnetic recording film surface was shaped convex, and this convex shape is not good as a shape of the magnetic recording medium;
(ii) Concavity: The magnetic recording film surface was shaped concave, and this concave shape is not good as a shape of the magnetic recording medium; and
(iii) Flatness: The surface of the magnetic recording film is shaped flat, and this flat shape is good as the shape of the magnetic recording medium.

The average molecular weight and Tg of urethane used in each examples and comparison examples and results of observation of the same were shown in Table 2.

TABLE 2

| Sample No. | Average Molecular Weight (Mw) | Glass-transition Temperature (Tg) | Observation of the Magnetic Film Surface |
|---|---|---|---|
| Comparison Example 2-1 | 10,000 | −30° C. | Concave |
| Comparison Example 2-2 | 20,000 | >50° C. | Convex |
| Comparison Example 2-3 | 30,000 | >50° C. | Convex |
| Example 2-1 | 45,000 | 15° C. | Flat |
| Example 2-2 | 50,000 | 10° C. | Flat |
| Example 2-3 | 52,000 | <10° C. | Flat |

From the data shown in Table 2, the following conclusion was obtained:

The shape of the magnetic recording medium was changed according to the Tg of polyurethane used therein. When the polyurethane having a Tg which is above room temperature was used as shown in Comparison examples 2-2 and 2-3, the shape became convex since shrinkage of the back coat layer is larger than that of the magnetic recording film. In contrast, when polyurethane having a Tg which is below room temperature was used as show in Comparison example 2-1, the shape became concave. And when the polyurethane having Tg about 10° C. and having an average molecular weight of about 50,000 was used, a flat shape which is suitable for a magnetic recording medium was obtained.

When Tg was controlled in the range slightly below room temperature by varying the average molecular weight of the polyurethane, the shape of the magnetic recording medium was apt to become flat. It is more preferable to use polyurethane having a Tg of about 10° C. to obtain flatness of the magnetic recording medium.

EXPERIMENT 3

Examples 3-1, 3-2 and 3-3 and Comparison Examples 3-1, 3-2 and 3-3

Many examples and comparison examples were made by using a plural kind of carbon powder, inorganic abrasive pigment and the like and varying thickness and mixing ratio thereof. In this experiment 3, an amorphous mixture of alumina and cobalt oxide is used as the inorganic abrasive.

These examples and comparison examples were formed by the same way as Example 1—1 except that:
(A) in the STEP(a): the thickness and width of polyimide film were changed to 10 μm thick and 200 mm wide;
(B) in the STEP(a): a CoCr film was formed as a first magnetic recording layer satisfying shown in the left column of Table 3 and a CoO film was formed as a second magnetic recording layer on the CoCr film satisfying specifics shown in the right column of Table 3;

TABLE 3

| | CoCr Film | CoO Film |
|---|---|---|
| Temperature of the Substrate | 250° C. | 110° C. |
| Deposition Rate | 80Å/sec | 50Å/sec |
| Incident Angle | 55°–30° | 25°–10° |

TABLE 3-continued

|  | CoCr Film | CoO Film |
|---|---|---|
| Thickness | 1600Å | 400Å |
| Ratio of Component (Atom) | Co:Cr = 80:20 | Co:O = 50:50 |
| Pressure | $5 \times 10^{-5}$ Torr | $1 \times 10^{-4}$ Torr |

(C) in the STEP (b): the following component were changed as shown in Table 4,
  (C-1) As to nitrocellulose, it was changed that nitrocellulose having low molecular weight was optionally used, and nitrocellulose having high molecular weight was optionally used;
  (C-2) As to carbon particles (black), the average diameter, the amount and combination of carbon particles were changed;
  (C-3) As to abrasive, the average particle diameter and amount of abrasive pigment were changed; and
(D) in the STEP(c): as shown in the following Table 4, the thickness of the back coat layer was changed.

TABLE 4

| Sample No. | (a) Nitrocellulose having high molecular weight was used or not (b) Nitrocellulose having low molecular weight was used or not | (a) Average particle diameter and amount (parts) of the carbon particles (a) (b) Average particle diameter and amount (parts) of the second carbon particles (b) | Average particle diameter and amount (parts) of the inorganic abrasive pigment | Thickness of the back coat layer (μm) |
|---|---|---|---|---|
| Comparison Example 3-1 | (a) Yes (b) Yes | (a) 0.02 μm and 80 parts (b) 0.03 μm and 0.4 parts | 0.45 μm and 4.5 parts | 0.1 |
| Comparison Enample 3-2 | (a) Yes (b) No | (a) 0.01 μm and 90 parts (b) 0.3 μm and 0.4 parts | 0.35 μm and 4.3 parts | 0.4 |
| Comparison Example 3-3 | (a) No (b) No | (a) 0.03 μm and 75 parts (b) 0.5 μm and 0.5 parts | 0.36 μm and 4.0 parts | 0.6 |
| Example 3-1 | (a) Yes (b) Yes | (a) 0.023 μm and 82 parts (b) 0.30 μm and 0.55 parts | 0.55 μm and 4.0 parts | 0.65 |
| Example 3-2 | (a) Yes (b) Yes | (a) 0.023 μm and 80 parts (b) 0.3 μm and 0.6 parts | 0.56 μm and 4.5 parts | 0.15 |
| Comparison Example 3-4 | (a) No (b) Yes | (a) 0.02 μm and 90 parts (b) 0.45 μm and 0.5 parts | 0.45 μm and 5.5 parts | 0.25 |
| Comparison Example 3-5 | (a) Yes (b) Yes | (a) 0.014 μm and 85 parts (b) 0.55 μm and 0.45 parts | 0.56 μm and 4.6 parts | 0.35 |

The following evaluation tests were made on different video tape samples obtained in the foregoing examples and comparison examples.

Surface Conductivity

The "surface conductivity" was measured by the "four prove method (Baw method)" using a surface conductivity tester type "LORESTA-FP" manufactured by MITSUBISHI PETROCHEMICAL COMPANY, LTD. JAPAN.

Adhesive Property to the Base Film

In order to define the adhesive property of the back coat layer to the non-magnetic substrate, after removing a cellophane tape applied on the back coat layer, an exfoliation of the back coat layer was observed. This test is defined in "ASTM-D-3002". In "ASTM-D-3002", 100 squares were defined on a surface area of the back coat layer and, after removing the cellophane tape, a number of squares whereon an exfoliation of the back coat layer was observed was counted.

Dynamic Frictional Coefficient ($\mu_k$) by Drawing Method

Dynamic frictional coefficient ($\mu_k$) was measured by a known drawing instrument. A 1m long tape sample was used for measurement under the following conditions: tension "P" was 20 gf, and running speed "v" was 8 mm/sec.

Cylinder Load

A cylinder load is defined as follows:
Video tape sample having 30m length was installed in a VTR cassette, and it was set in an 8 mm system VTR which has a 40 mmφ cylinder of aluminum having two pairs of amorphous heads ("LAM HEAD")*.

In a play-back state, at a running speed of 14.5 mm/min, the cylinder load was measured by a pen recorder as a voltage meter.

* LAM HEAD means Laminated Amorphous Magnetic layer Head.

Table 5 shows results of these evaluation tests as to respective sample tapes.

TABLE 5

| Sample No. | Conductivity ($\Omega/cm^2$) | A number of squares per 100 squares | Dynamic frictional coefficient ($\mu_k$) | Cylinder load (mV) |
|---|---|---|---|---|
| Comparison Example 3-1 | $5 \times 10^7$ | 35/100 | 0.35 | 76 |
| Comparison Example 3-2 | $4 \times 10^6$ | 55/100 | 0.28 | 72 |
| comparison Example 3-3 | $8 \times 10^7$ | 50/100 | 0.25 | 56 |
| Example 3-1 | $5 \times 10^6$ | 25/100 | 0.23 | 44 |
| Example 3-2 | $6 \times 10^6$ | 35/100 | 0.22 | 51 |
| Comparison Example 3-4 | $3 \times 10^7$ | 65/100 | 0.31 | 60 |
| Comparison Example 3-5 | $8 \times 10^6$ | 45/100 | 0.29 | 53 |

From results shown in Table 5, the following conclusions were obtained:

As to the Comparison example 3-2 including only nitrocellulose having low molecular weight, the Comparison example 3-4 including only nitrocellulose having high molecular weight and the Comparison example 3—3 including no nitrocellulose, the number of squares was relatively large, and this showed insufficient adhesive property. This would be caused by a lowering of the mechanical strength of the back coat layer. Moreover, a relatively large dynamic frictional coefficient and the cylinder load were shown in these comparison examples; thus, it meant insufficient wear resistance and runability.

In a comparison of the Example 3-1 including the carbon particles of an average particle diameter of 0.023 μm with the Comparison example 3-5 including that of an average particle diameter of 0.014 μm, a relatively large dynamic frictional coefficient and the cylinder load were shown in the Comparison example 3-5. Moreover, the adhesive property of the Comparison example 3-5 was inferior to that of the Example 3-1. Thus, it was suitable to use additionally the carbon particles having an average particle diameter of about 0.02 μm.

From the data of the Comparison examples 3-2, 3-3 and 3-4, though sufficiently large conductivity (i.e. low surface resistivity) was shown, the adhesive property, the dynamic frictional coefficient and the cylinder load were not good. This means that the average particle diameter and/or the mixing ratio of the carbon powder and/or the adhesive were not suitable in these Comparison examples.

The Comparison example 3-1 which has a relatively thin back coat layer showed unstable runability owing to lowering of wear resistance as shown in the large value of the cylinder load. In contrast, the Examples 3-1 and 3-2 showed a small number of squares, small dynamic frictional coefficient of about 0.2 and small cylinder load of about 50 mV. Thus, improved runability was obtained in these Examples.

EXPERIMENT 4

Example 4-1

Tape samples of Example 4-1 were made by the following procedure:

STEP(a): Co-Cr (Co:Cr=8:2 in ratio of atoms, the same as that of the Example 1—1.) was deposited on one face of a 9 μm thick polyimide film (having 150 μm width) as the non-magnetic substrate 1 by a continuous vapor deposition method to form a 2000 Å thick Co-Cr film as the magnetic recording film 2, and thickness of the CoCr film was obtained by an SEM;

STEP(b): A coating material for the back coat layer was prepared by mixing and dispersion of the following materials;

| | |
|---|---|
| (1-1) Polyurethane (a) (Mw: 50,000) | 36.0 parts |
| (1-2) Polyurethane (b) (Mw: 80,000) | 3.7 parts |
| (2) Nitrocellulose | |
| (2.1) Nitrocellulose having low molecular weight (Index of average molecular weight of 1/16 sec) | 25.5 parts |
| (2.2) Nitrocellulose having high molecular weight (Index of average molecular weight of ½ sec) | 10.6 parts |
| (3) Carbon black | |
| (3.1) Carbon black (a) (Average particle diameter: 0.023 μm) | 85.0 parts |
| (3.2) Carbon black (b) (Average Particle diameter: 0.3 μm) | 0.5 parts |
| (3.3) Carbon black (c) (Average particle diameter: 0.09–0.25 μm) | 6.8 parts |
| (4) Abrasive pigment (CoAl$_2$O$_3$) (Average particle diameter: 0.045 μm) | 4.2 parts |
| (5) Isocyanate hardener | 14.4 parts |
| (6) Methyl ethyl ketone | 65.0 parts |
| (7) Toluene | 105.2 parts |

-continued

| | |
|---|---|
| (8) Cyclohexane | 13.3 parts; |

STEP(c): The coating material for the back coat layer was applied on an opposite face of the polyimide film to the face deposited by the magnetic recording film and dried to form a back coat layer having thickness of between 0.4 μm and 0.5 μm with the use of the gravure coating process shown in FIG. 2 under the following conditions:

| | |
|---|---|
| (1) Gravure mesh | #200 |
| (2) Rotation speed of the gravure roll 5 | 100 rpm |
| (3) Tape speed | 5 m/min |
| (4) Temperature for drying | 110–150° C.; and |

STEP(d): The applied film was slit to give tape samples (8 mm width, 30 m length).

The following evaluation test as to running was made on different tape samples obtained in the foregoing example.

Dynamic Frictional Coefficient ($\mu_k$) by Sailing Method

Fifty transits by each tape sample were made by the known sailing instrument having strain meters. Measurements of the dynamic frictional coefficient were made at the first transit and after repeating fifty transits, and the surface of each tape sample was observed. One transit means one round-trip of the tape. The condition as to running by the sailing instrument is as follows:

The tape sample (8 mm width and 30m length) was wound on and around a post (4φ×25 mm length) made of SUS303-stainless steel (having mean surface roughness of Ra 0.2S) at a winding angle of 180°; tension was 20 gf; and running speed was 8 mm/sec.

Table 6 shows the results of the evaluation test.

TABLE 6

| | $\mu_k$ | |
|---|---|---|
| Example | 1st Transit | After Repeating 50 Transits |
| Example 4-1 | 0.12 | 0.12 |

As shown in Table 6, the magnetic recording medium of Example 4-1 shows small dynamic frictional coefficient at the first transit, and the small dynamic frictional coefficient has not been changed even after repeating fifty transits, so that it showed improved wear resistance wherein undesirable exfoliation does not occur.

Thus, it was understood that the magnetic recording medium having improved runability was also obtained by applying the back coat layer which includes not only a polyurethane (a) having a Tg below room temperature but also a polyurethane (b) having a Tg of above 60° C. on an opposite face of the non-magnetic substrate to the face covered by the magnetic recording film of CoCr in comparison with the aforementioned Example 1—1. The polyurethane (b) has high degree of polymerization.

EXPERIMENT 5

Examples 5-1, 5-2, 5-3 and Comparison example 5-1

Many examples and comparison examples were made by changing the amount of stearic acid added as a lubricant.

These examples and comparison examples were formed by the same way of making Example 1—1 except that:
- (A) in the STEP(a); the thickness of the polyimide film was changed to be 10 μm thick;
- (B) in the STEP(a): a CoCr film was made as a first magnetic recording layer satisfying specifics shown in a left column of Table 7 and a CoO film was made as a second magnetic recording layer on the CoCr film satisfying specifics shown in a right column of table 7; and
- (C) in the STEP(b): as shown in Table 8, the added amount of stearic acid was changed.

The following evaluation tests were made on different tape samples obtained in the foregoing examples and comparison examples.

TABLE 7

|  | CoCr film | CoO Film |
|---|---|---|
| Temperature of the substrate | 250° C. | 100° C. |
| Deposition Rate | 800Å/sec | 500Å/sec |
| Incident Angle | 55°–30° | 25°–10° |
| Thickness | 2000Å | 500Å |
| Ratio of Component (Atom) | Co:Cr = 80:20 | Co:O = 50:50 |
| Pressure | 5 × 10$^{-5}$ Torr | 1 × 10$^{-4}$ Torr |

Coefficient of Friction $\mu_k$

An evaluation test as to sliding was made on a test sheet (8 mm width, 50 mm length) of tape samples by a Bowden-Tabor Type Friction Tester of a type "DF-PM" manufactured by KYOWAKAIMENKAGAKU Co., Ltd. JAPAN. The measurement of $\mu_k$ and observation of the surface were made by repeating 100 transits sliding of each tape samples by the tester. The condition as to sliding by the tester was as follows; the tape sample was slid on a slider (10 mm × 10 mm) made of SUS303-stainless steel; the load weight was 20 gf; the distance of sliding was 20 mm, and the sliding speed was 1 mm/min. The results of the test were also shown in Table 8.

Analysis of Transfer of Component in the Back Coat Layer onto the Magnetic Recording Film A C/Co ratio is defined as a ratio of a mass of C (carbon) with exists on the surface of the magnetic recording film to a mass of Co (cobalt) which exists on the same. It was obtained by quantitative analysis of ESCA (electron spectroscopy for chemical analysis) of C and Co which exist on the magnetic recording film. That is, when a transfer of component in the back coat layer onto the magnetic recording film occurs, a mass of C which exists on the surface of the magnetic recording film increases so that the C/Co ratio becomes large. The change of the C/Co ratio obtained after coating of the back coat layer in comparison with that obtained before coating was also shown in Table 8.

TABLE 8

| Sample No. | Amount of Added Lubricant (wt %) | $\mu_k$ after repeating 100 transits | Change of the C/Co ratio |
|---|---|---|---|
| Example 5-1 | 0.11 | 0.11 | No Change was Observed |
| Example 5-2 | 0.52 | 0.11 | No Change was observed |
| Example 5-3 | 0.95 | 0.95 | Increment of 0.1% was Observed |
| Comparison Example 5-1 | 5.1 | 0.08 | Increment of 3.0% was Observed |

From the results shown in Table 8, the following conclusions were obtained:

The larger the amount of added lubricant (i.e. stearic acid) became, the more the runability was improved; however, when the added amount of the lubricant reached 0.95% by weight, an undesirable transfer of component in the back coat layer onto the magnetic recording film began to occur. Thus, it is preferable to add the lubricant less than 1% by weight. That is, a lubricant addition of less than 1% by weight results in improved runability and never brings a bad influence upon the magnetic recording film.

EXPERIMENT 6

Example 6-1

Tape samples of Example 6-1 were made by the following procedure:

STEP(a): Co-Cr (Co:Cr=8:2 in ratio of atoms, the same as that of Example 1—1.) was deposited on one face of a 10 μm thick polyimide film (having 150 μm width) as the non-magnetic substrate 1 by a continuous vapor deposition method to form a 1600 Å thick Co-Cr film as the magnetic recording film 2, and the thickness of the CoCr film was obtained by the SEM;

STEP(b): A coating material for the back coat layer was prepared by mixing and dispersing the following materials;

| (1) Polyurethane | |
|---|---|
| (1-1) Polyurethane (a) (Mw : 50,000) | 36.0 parts |
| (1-2) Polyurethane (b) (Mw : 80,000) | 1.1 parts |
| (2) Nitrocellulose | |
| (2.1) Nitrocellulose having low molecular weight (Index of average molecular weight of 1/16 sec) | 25.5 parts |
| (2.2) Nitrocellulose having high molecular weight (Index of average molecular weight of ½ sec) | 10.6 parts |
| (3) Carbon black | |
| (3.1) Carbon black (a) (Average particle diameter: 0.023 μm) | 85.0 parts |
| (3.2) Carbon black (b) (Average Particle diameter: >0.3 μm) | 0.5 parts |
| (3.3) Carbon black (c) (Average particle diameter: 0.15-1.0 μm) | 2.1 parts |
| (4) Abrasive pigment (CoAl$_2$O$_3$) | 4.2 parts |
| (5) Isocyanate hardener | 14.4 parts |
| (6) Methyl ethyl ketone | 65.0 parts |
| (7) Toluene | 105.2 parts |
| (8) Cyclohexane | 13.3 parts; |

STEP(c): The coating material for the back coat layer was applied on an opposite face of the polyimide film to the face deposited by the magnetic recording film and dried to form a back coat layer having thickness of between 0.35 μm and 0.3 μm with the use of the gravure coating process shown in FIG. 2 under the following conditions:

| | |
|---|---|
| (1) Gravure mesh | #230 |
| (2) Rotation speed of the gravure roll | 100 rpm |
| (3) Tape speed | 5 m/min |
| (4) Temperature for drying | 110–120° C.; and |

STEP(d): The applied film was slit to give tape samples (8 mm width, 30m length).

The following evaluation test of drawing was made on different video tape samples obtained in the foregoing example 6-1.

Dynamic Frictional Coefficient ($\mu_k$) by Drawing Method

The dynamic frictional coefficient ($\mu_k$) was measured by the same drawing instrument used in the Experiment 3. The conditions for measurement were the same as those of Experiment 3 except that only the tension "P" was changed as shown in Table 9.

Table 9 shows the results of measurement of sample tapes.

TABLE 9

| | $\mu_k$ | |
|---|---|---|
| Tension (P) | 1st Transit | After Repeating 50 Transits |
| 10 gf | 0.12 | 0.12 |
| 20 gf | 0.10 | 0.11 |
| 40 gf | 0.09 | 0.12 |

As shown in Table 9, the magnetic recording medium of Example 6-1 had a low $\mu_k$ and had improved runability. Further, even after repeating 50 transits, $\mu_k$ changed little. This means that it has an improved wear resistance.

That is, the addition of the carbon particles having relatively large diameter brought a more coarsened surface of the back coat layer, so that the magnetic recording medium having more improved runability was obtained.

EXPERIMENT 7

Examples 7-1, 7-2, 7-3, 7-4 and 7-5

Many examples were formed by using the carbon particles having different diameter with different added amounts of the same as shown in Table 10. These examples were made in the same way as Example 6-1.

The following evaluation tests were made on different video tape samples obtained in the foregoing examples and comparison examples.

Surface Roughness of the Back Coat Layer and of the Magnetic Recording Film

The surface roughness of the back coat layer and of the magnetic recording film was measured by a non-contact type three dimensional surface roughness meter "Type TOPO3D" manufactured by WYKO CO., LTD. U.S.A. Values of respective Rms* and Ra* were obtained as index of surface roughness.

\* These values are defined in JIS (Japanese Industrial Standard) B-0601.

Observation of the Magnetic Recording Film Surface

The magnetic recording film surface of each tape samples was observed.

The result of observation was defined as follows:
 (i) Convex: The magnetic recording film surface was shaped convex;
 (ii) Concave: The magnetic recording film surface was shaped concave; and
 (iii) Flat: The magnetic recording film surface was shaped flat.

The average particle diameter and amount of the carbon particles used in each examples and result of the evaluation tests are shown in Table 10.

TABLE 10

| Sample No. | (a) Average particle diameter of the carbon particles (a) ($\mu$m) (b) Average particle diameter of the carbon particles (b) ($\mu$m) (c) Average particle diameter of the carbon particles (c) ($\mu$m) | (a) Amount of added carbon particles (a) (wt %) (b) Amount of added carbon particles (b) (wt %) (c) Amount of added carbon particles (c) (wt %) | The back coat layer surface Rms (nm) | The back coat layer surface Ra (nm) | The magnetic recording film surface Rms (nm) | The magnetic recording film surface Ra (nm) | Observation of the magnetic recording film surface |
|---|---|---|---|---|---|---|---|
| Example 7-1 | (a) 0.023 (b) >0.3 (c) — | (a) 85 (b) 0.5 (c) — | 12.0 | 8.91 | 2.8 | 2.45 | Flat |
| Example 7-2 | (a) 0.023 (b) >0.3 (c) 0.09–0.25 | (a) 85 (b) 0.6 (c) 5.2 | 25.1 | 21.2 | 2.92 | 2.66 | Flat |
| Example 7-3 | (a) 0.023 (b) >0.3 (c) 0.09–0.25 | (a) 85 (b) 0.6 (c) 5.5 | 27.6 | 23.2 | 2.95 | 2.68 | Convex |
| Example 7-4 | (a) 0.023 (b) >0.3 (c) 0.15–1.0 | (a) 85 (b) 0.6 (c) 2.0 | 42.0 | 33.3 | 3.21 | 2.89 | Concave |
| Example 7-5 | (a) 0.023 (b) >0.3 (c) 0.15–1.0 | (a) 85 (b) 0.5 (c) 2.2 | 46.0 | 35.5 | 3.21 | 3.13 | Concave |

From the data shown in Table 10, the following conclusion was obtained:

Mixing of three kinds of the carbon particles having different diameter led to large value of Rms and Ra of the back coat layer surface, and showed coarsened surface of the same. The coarsened surface of the back coat layer realized improved runability, and further, judging from value of Rms and Ra of the magnetic layer surface, only a little influence of the coarsened surface of the back coat layer upon the magnetic recording film surface owing to transcription of shape was shown. Judging from observations of the magnetic recording film surface, a convex or concave shape was not so hard that a little influence of curl was obtained. Thus, the magnetic recording medium having a coarsened surface obtained by utilizing three kinds of carbon particles was suitable in practical use.

EXPERIMENT 8

Examples 8-1 and 8-2 and Comparison examples 8-1, 8-2, 8-3 and 8-4

In this Experiment 8, tape samples which have only the back coat layer and do not have the magnetic recording film were made by the following procedure:

STEP(a): A coating material for the back coat layer was prepared by mixing and dispersion of the following materials. The amount of the materials (e.g. polyurethane, hardener, Methyl ethyl ketone, toluene and cyclohexane) were altered in each example as shown in Table 11.

| | |
|---|---|
| (1) Polyurethane (Mw = 50,000) | Altered |
| (2) Nitrocellulose | |
| (2.1) Nitrocellulose having low molecular weight (Index of average molecular weight of 1/16 sec*[1]) | 25.5 parts |
| (2.2) Nitrocellulose having high molecular weight (Index of average molecular weight of 1/16 sec*[1]) | 10.6 parts |
| (3) Carbon black | |
| (3.1) Carbon black (a) (Average particle diameter: 0.023 $\mu$m) | 85.0 parts |
| (3.2) Carbon black (b) (Average particle diameter: 0.3 $\mu$m) | 0.5 parts |
| (4) Abrasive pigment (CoAl$_2$O$_3$) | 4.2 parts |
| (5) Isocyanate hardener | Altered |
| (6) Stearic acid | 2.0 parts |
| (7) Methyl ethyl ketone | Altered |
| (8) Toluene | Altered |
| (9) Cyclohexane | Altered |

STEP(b): The coating material for the back coat layer was applied on one face of a 10 $\mu$m thick polyimide film (150 mm width) and dried to form a 0.5 $\mu$m thick back coat layer with use of the gravure coating process shown in FIG. 2 under the following condition:

| | |
|---|---|
| (1) Gravure mesh | #150 |
| (2) Rotation speed of the gravure roll | 70 rpm |
| (3) Tape speed | 4.5 m/min |
| (4) Temperature for drying | 80–120° C.; and |

STEP(c): The applied film was slit to give tape samples (8 mm width, 30 length).

The following evaluation tests were made on different tape samples obtained in the foregoing examples.

Surface Roughness of the Back Coat Layer

The surface roughness of the back coat layer was measured by the non-contact type three dimensional surface roughness meter "Type TOPO-3D". The results of these measurements are shown in FIGS. 3–8. FIGS. 3, 4, 5, 6, 7 and 8 are enlarged perspective views (with 100× magnification) of the back coat layer of respective Comparison examples 8-1, 8-2 and 8-3, and Example 8-1 which were obtained by the surface roughness meter. Measured values of indexes (respective Ra*, Rms* and P-V*) are also shown in Table 11.

* These indexes are defined in JIS (Japanese Industrial Standards) B-0601.

Young's Modulus

Young's modulus of the tape sample was measured by a Young's modulus meter "TM-7000" (manufactured by SHINKU RIKOU CO LTD. JAPAN).

The results of the tests are shown in Table 11 with altered components of the back coat layer.

From the data shown in Table 11, the following conclusion was obtained:

As to the back coat layer formed by using such a range of the proportion of the components shown in Comparison examples 8-1, 8-2, 8-3 and 8-4, it is judged from the data of surface roughness that a sufficient exposure of the inorganic particles was not obtained, and from the data of Young's modulus that a sufficiently improved strength was not obtained.

TABLE 11

| | Altered Components of the Back Coat Layer | | | | | Indexes of Surface Roughness | | | Young's |
|---|---|---|---|---|---|---|---|---|---|
| Sample No. | Urethane (wt %) | Hardener (wt %) | Methyl ethyl ketone (wt %) | Toluene (wt %) | Cyclohexane (wt %) | Ra (nm) | Rms (nm) | P-V (nm) | Modulus (kg/cm$^2$) |
| Comparison Example 8-1 | 1.50 | 3.00 | 20.0 | 24.0 | 3.00 | 8.57 | 10.8 | 88.1 | 670 |
| Comparison Examole 8-2 | 2.00 | 2.10 | 15.0 | 20.0 | 3.60 | 11.2 | 14.2 | 182.0 | 650 |
| Comparison Example 8-3 | 2.50 | 2.50 | 30.0 | 26.0 | 5.00 | 7.12 | 8.99 | 79.2 | 700 |
| Example 8-1 | 3.50 | 3.30 | 18.0 | 30.0 | 4.00 | 3.96 | 4.98 | 46.1 | 770 |
| Example 8-2 | 3.00 | 2.68 | 26.0 | 35.0 | 3.57 | 6.79 | 8.41 | 61.1 | 800 |
| Comparison Example 8-4 | 4.00 | 2.51 | 20.0 | 36.0 | 6.00 | 9.24 | 11.6 | 85.5 | 710 |

In contrast, as to the back coat layer formed by using such a suitable range of the proportion of the components as shown in the Examples 8-1 and 8-2, a relatively small value of surface roughness was obtained. In comparison with the value of Young's modulus (i.e., about 550 kg/cm$^2$) of the non-magnetic substrate having no back coat layer, the Young's modulus was increased by about 30%. Further, in the non-magnetic substrate having no back coat layer, Young's modulus of machine direction (lengthwise direction) and that of transverse direction (widthwise direction) differ from each other. For example, that of transverse direction was 535 kg/cm$^2$ and that of machine direction was 585 kg/cm$^2$. In our experiment, the above-mentioned enlargement of Young's modulus owing to the back coat layer never depended on the direction.

From these results, the condition of dispersion in the coating material and process of hardening would depend on the range of the proportion of components. Thus, the back coat layer formed by using such a suitable range of the proportion of components resulted in improved smoothness, dynamic strength and runability of the magnetic recording medium.

EXPERIMENT 9

Examples 9-1 and 9-2 and Comparison examples 9-1, 9-2 and 9-3

In these examples and comparison examples, filtration of the coating material for the back coat layer was made before coating.

These examples were formed in the same way as Example 1—1 except that before STEP(c), filtration of the coating material was made under the conditions shown in Table 12.

As an evaluation test, observation of the back coat layer surface through an optical microscope was made with 100× magnification.

The result of the observation was defined as follows;
(i) Good:

The particles (e.g. carbon particles, particles of inorganic abrasive pigment and the like) having unusual diameter was scarcely observed.
(ii) Poor:

Some particles having an unusual diameter were observed.

Table 12 shows the result of observation.

As to the Examples 9-1 and 9-2, the filter medium type "HT-04XA" (which is manufactured by NIHON ROKI CO., LTD. JAPAN) has such a performance that particles which pass through the filter have an average particle diameter of 0.4 μm and a maximum diameter of 1.0 μm. From observation of the tape samples of these examples, little presence of the particles (e.g. carbon particles, particles of inorganic abrasive pigment and the like) having an unusual diameter was seen.

As to the Comparison examples 9-2 and 9-3, the filter medium type "HT-06XA" and type "HT-30" have such a performance that particles which pass through the filter have an average particle diameter relatively larger than that of the filter medium type "HT-04XA" and have a maximum diameter relatively larger than that of the same. Thus, from observation, some particles having an unusual diameter were shown.

As to the Comparison examples 9-1 wherein the filtration pressure of larger than 2.0 kg/cm² and the filtration time of less than 60 minutes were used, though the suitable filter medium of "HT-04XA" was used therein, sufficient effect of filtration was not obtained. Thus, it is necessary to use a suitable filter under the suitable conditions such as filtration pressure of below 2.0 kg/cm² and filtration time which is longer than 60 minutes in the flow rate of 1000 g/min of the coating material.

TABLE 12

| Sample No. | Type of Filter Medium | Filtration Pressure (Kg/cm²) | *1 Filtration Period (minute) | Result of Observation |
|---|---|---|---|---|
| Example 9-1 | Type HT-04XA | 1.5 | 90 | Good |
| Comparison Example 9-1 | Type HT-04XA | 2.5 | 30 | Poor |
| Example 9-2 | Type HT-04XA | 2.0 | 60 | Good |
| Comparison Example 9-2 | Type HT-06XA | 2.0 | 60 | Poor |
| Comparison Example 9-3 | Type HT-30 | 1.5 | 90 | Poor |

*1 In the flow rate of 1000 g/min of the coating material

EXPERIMENT 10

Example 10-1 and Comparison Example 10-1

In the Example 10-1 and Comparison example 10-1, the back coat layer was formed by using the same material of the Example 8-1. The thickness of the back coat layer was 0.6 μm. A 9 μm thick polyimide film was used as the non-magnetic substrate 1, and a CoCr film was formed as a first magnetic recording layer satisfying specifics shown in the left column of Table 13 and a CoO film was formed as a second magnetic recording layer satisfying specifics shown in the right column of Table 13 on the CoCr film.

TABLE 13

|  | CoCr Film | CoO Film |
|---|---|---|
| Temperature of the Substrate | 250° C. | 100° C. |
| Deposition Rate | 800Å/sec | 500Å/sec |
| Incident Angle | 75°–20° | 40°–10° |
| Thickness | 1000Å | 600Å |
| Ratio of Component (Atom) | Co:Cr = 75:25 | Co:O = 60:40 |
| Pressure | $5 \times 10^{-5}$ Torr | $1 \times 10^{-3}$ Torr |

In the Example 10-1, before applying the coating material for the back coat layer, filtration was performed similar to the Example 9-2. In contrast, in the Comparison example 10-1, no filtration was made.

Figure 9A:
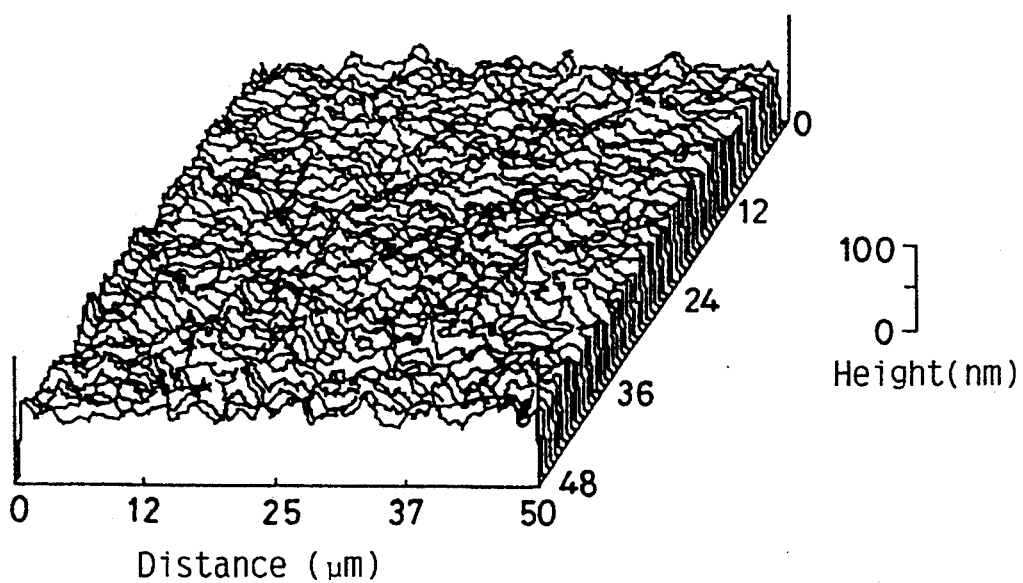
FIG. 9(a) is an enlarged perspective view (with 100× magnification) of the back coat layer of Example 10-1.
Figure 9B:
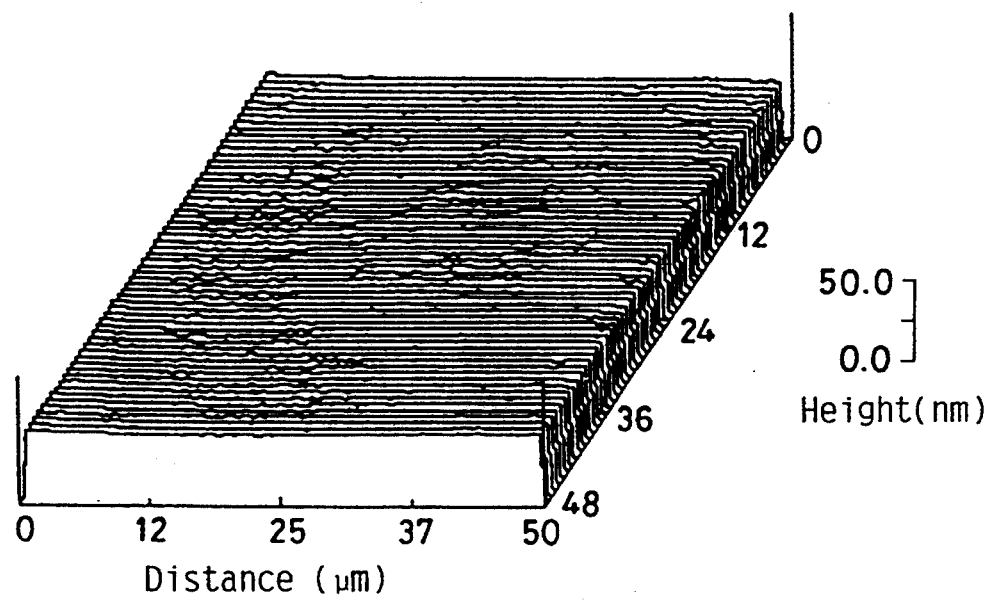
FIG. 9(b) is an enlarged perspective view (with 100× magnification) of the magnetic recording film of Example 10-1.
Figure 10A:
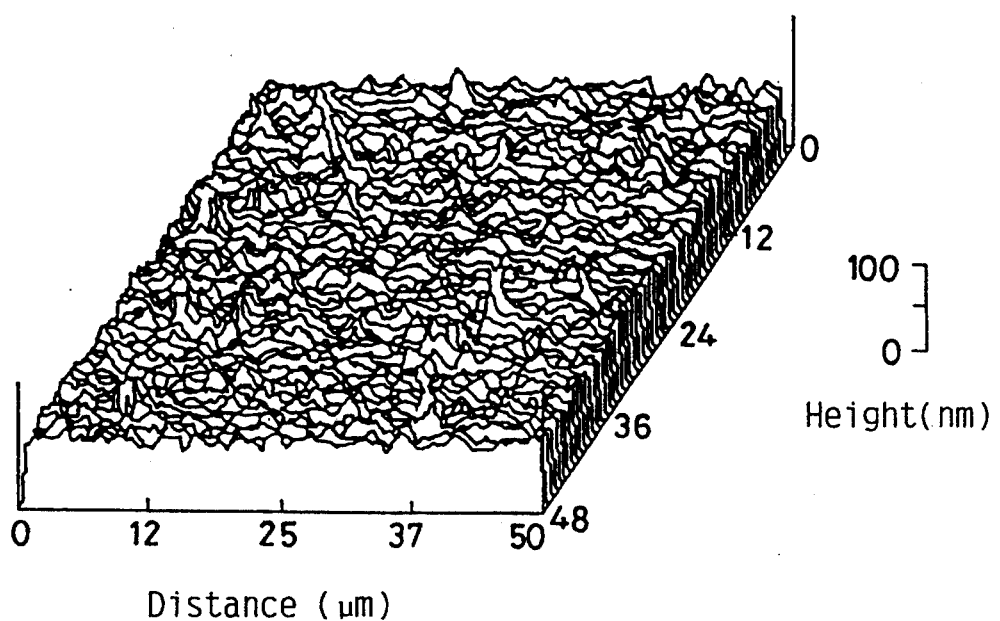
FIG. 10(a) is an enlarged perspective view (with 100× magnification) of the back coat layer of Comparison example 10-1.
Figure 10B:
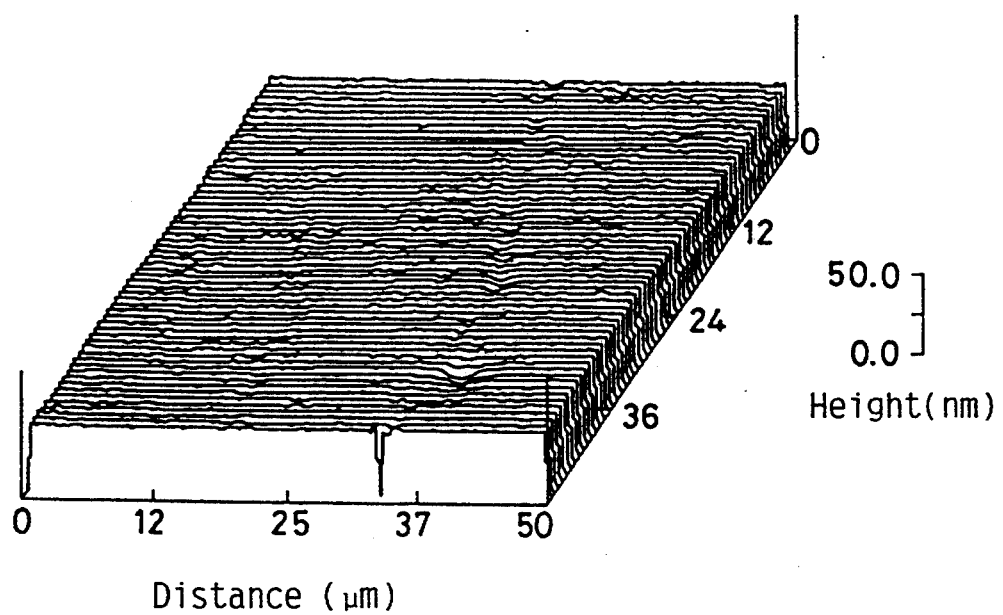
FIG. 10(b) is an enlarged perspective view (with 100× magnification) of the back coat layer of Comparison example 10-1.
Figure 11:
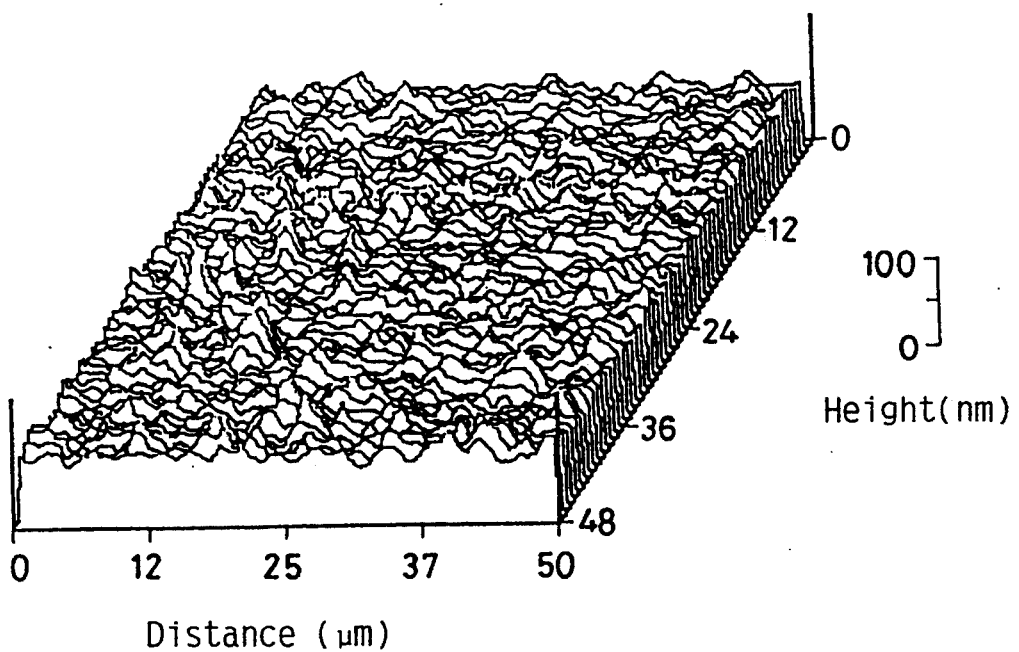
FIGS. 11, 12, 13, 14, 15, 16, 17 and 18 are enlarged perspective views (with 100× magnification) of the back coat layer of respective Example 12-1, Comparison example 12-1, Comparison example 12-2, Example 12-2, Comparison example 12-3, Example 12-3, Comparison example 12-4 and Example 12-4 which were obtained by the surface roughness meter.
Figure 12:
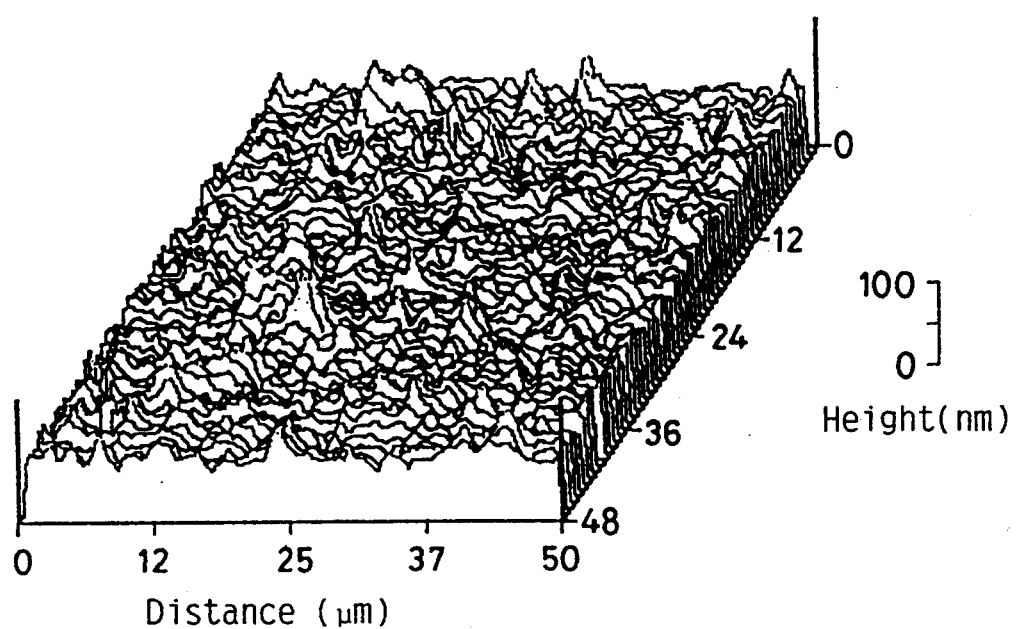
Figure 13:
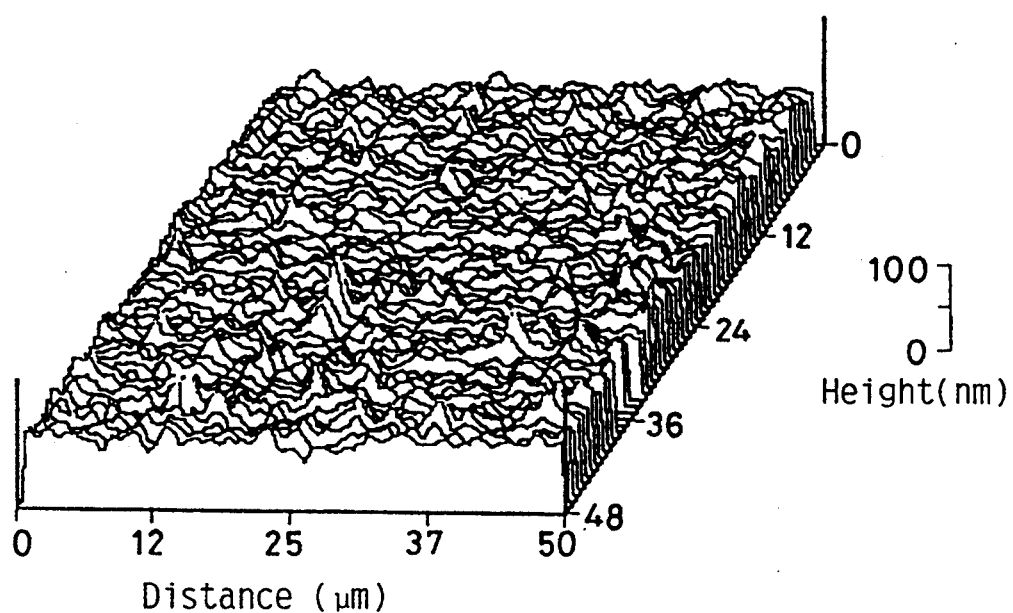
Figure 14:
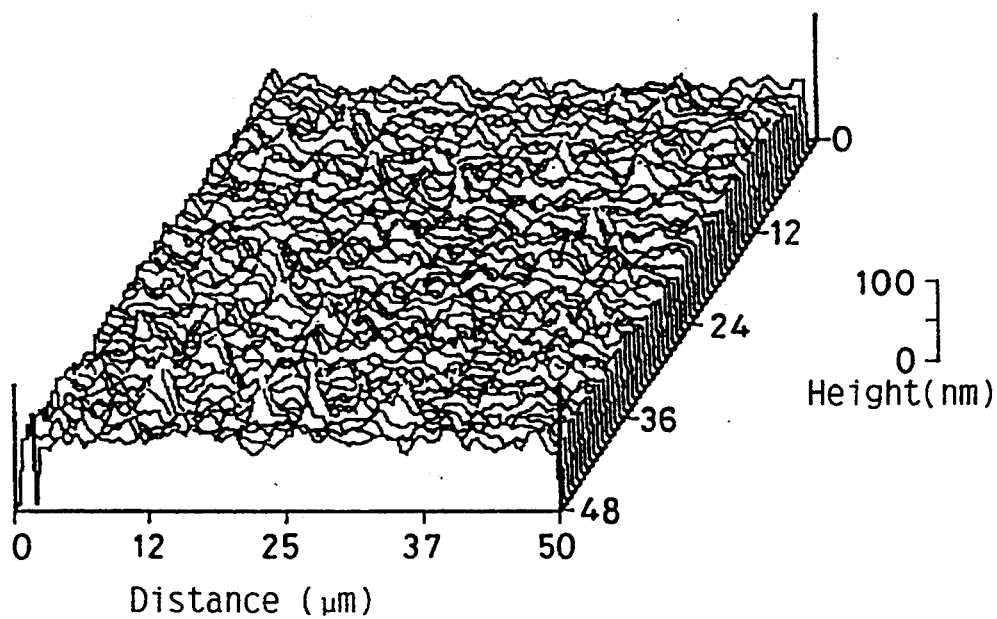
Figure 15:
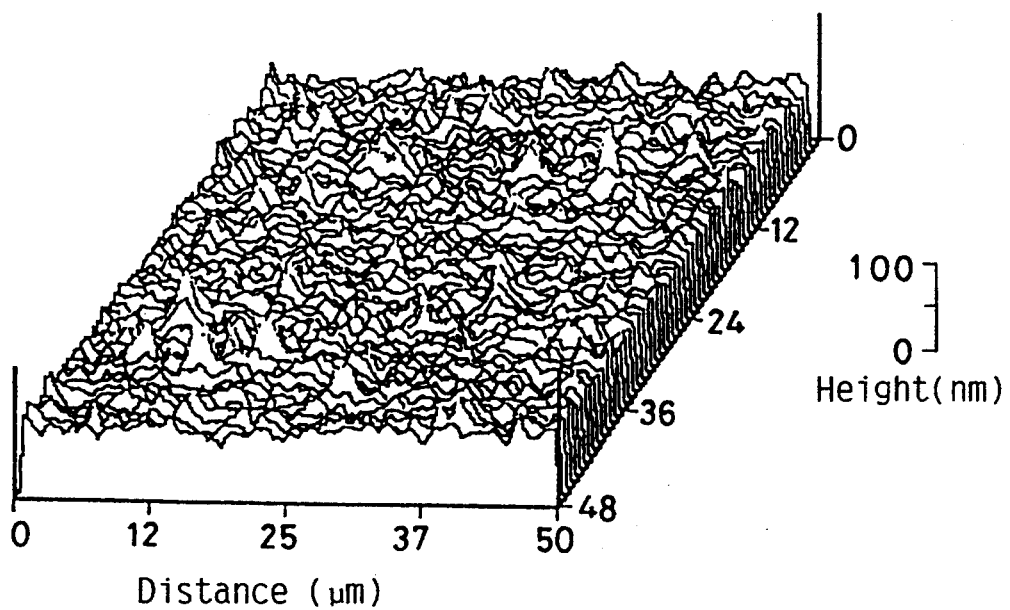
Figure 16:
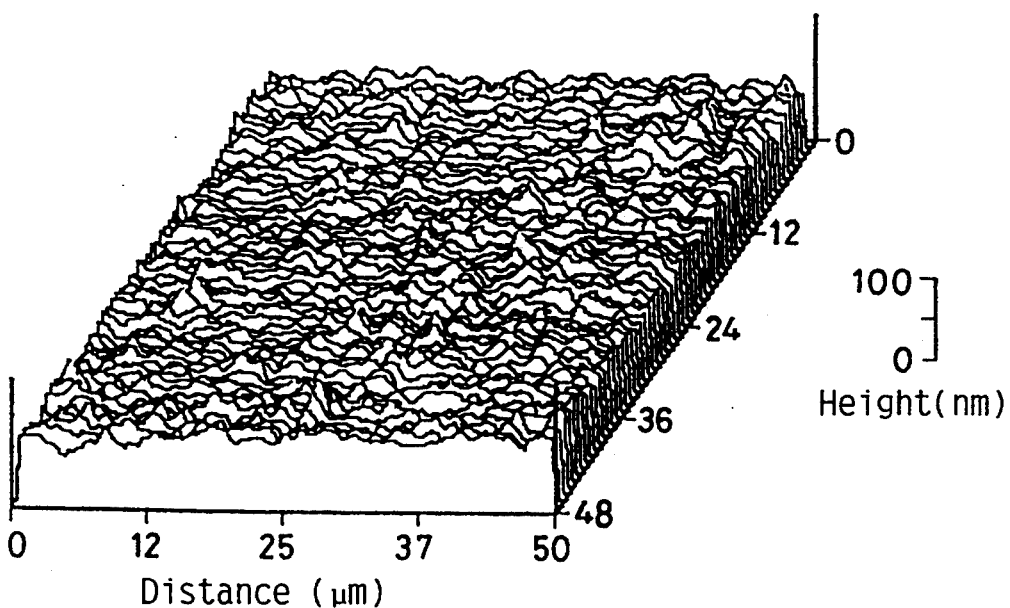
Figure 17:
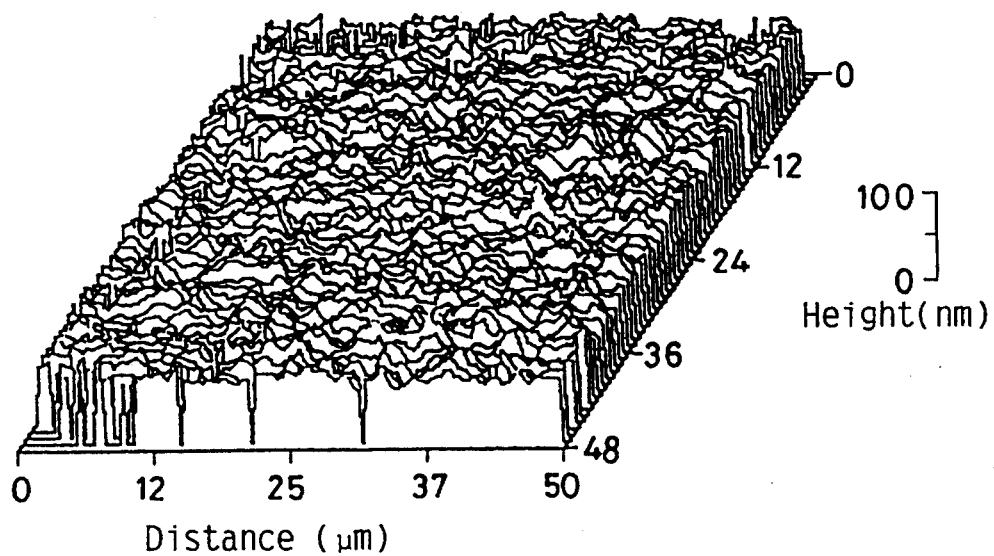
Figure 18:
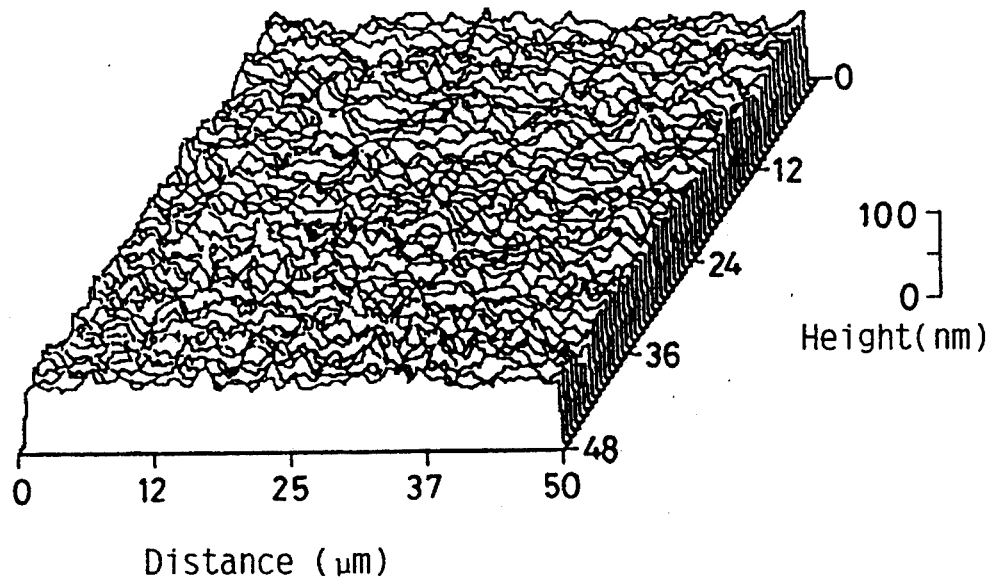

Surface roughness of the back coat layer and the magnetic recording film of respective Example 10-1 and Comparison example 10-1 was measured by a non-contact type three dimensional surface roughness meter "Type TOPO3D". The results of the measurements are shown in FIGS. 9 and 10. FIGS. 9(a) and 10(a) are enlarged perspective/views (with 100× magnification) of the back coat layer of respective Example 10-1 and Comparison example 10-1, and FIGS. 9(b) and 10(b) are enlarged perspective views (with 100× magnification) of the magnetic recording film of respective Example 10-1 and Comparison example 10-1. As shown in FIG. 10(b), hollows on the surface were observed on the magnetic recording film, and contrary thereto no hollows on the surface were observed in FIG. 9(b). That is, the flat surface of the magnetic recording film was obtained in Example 10-1.

Thus, the suitable filtration was effective in order to obtain more improved magnetic recording medium having no transfer, no transcription and good runability.

EXPERIMENT 11

Examples 11-1, 11-2, 11-3 and 11-4 and Comparison Examples 11-1 and 11-2

Many examples and comparison examples were made by changing the mixing ratio of the isocyanate hardener and changing features of the carbon powder by a previous surface treatment as shown in Table 14. These examples and comparison examples were formed by the same way as that of Examples 10-1 except that:

(A) in the STEP(a): The CoCr film and the CoO film which are as same as those in the Example 10-1 were formed; and (B) in the STEP(c): The thickness of the back coat layer was changed to 0.35 μm.

In Example 11-1 and 11-2 and Comparison examples 11-1 and 11-2, only the mixing ratio of the hardener was changed. In Example 11-3 and 11-4, a previous treatment was made on the carbon powder by a silane (group) coupling agent as follows: An ultrasonication was made on the carbon powder for 5 minute in a solution wherein 1 wt % noctyltriethoxysilane is dissolved in isopropyl alcohol.

The following evaluation test was made on different tape samples obtained in the foregoing examples and comparison examples.

Coefficient of Friction $\mu_k$

An evaluation test as to sliding was made on a test sheet (8 mm width, 50 mm length) of tape samples by a Bowden-Tabor Type Friction Tester of a type "DF-PM" manufactured by KYOWAKAIMENKAGAKU Co., Ltd. JAPAN. Measurement of $\mu_k$ and observation of the surface were made by repeating 100 transits sliding of each tape samples by the tester. Condition as to sliding by the tester was as follows: the tape sample was slid on a slider (10 mm × 10 mm) made of SUS303-stainless steel; the load weight was 20 gf; the distance of sliding was 20 mm, and the sliding speed was 1 mm/min. The results of the test are also shown in Table 14.

From the data shown in Table 14, the following conclusion was obtained:

On the Comparison example 11-1 wherein the mixing ratio of the hardener was below 4% by weight and in the Comparison example 11-2 wherein that was above 6% by weight, damage on the surface was shown in each of the Comparison examples. Thus, these Comparison examples 11-1 and 11-2 had poor wear resistance.

In contrast, in the Examples 11-1 and 11-2 wherein the mixing ratio of the hardener was in the range of between 4% and 6% by weight, a small $\mu_k$ was obtained and no damage was observed. Thus, improved scratch resistance was obtained in Examples 11-1 and 11-2.

In the Examples 11-3 and 11-4 wherein the carbon powder after the ultrasonication were used, $\mu_k$ became smaller than that of the Examples 11-1 and 11-2 wherein no ultrasonification was made. Thus, more improved runability was obtained in Examples 11-3 and 11-4. A magnetic recording medium having more improved runability was obtained owing to the above-mentioned easy treatment of ultrasonification of the carbon powder.

TABLE 14

| Sample No. | Mixing Ratio of the Hardener | Whether the Ultrasonication on the Carbon Particles was Made or Not | Observation of the Surface of the Back Coat Layer | $\mu_k$ after Repeating 100 Transits |
|---|---|---|---|---|
| Example 11-1 | 5.5 wt % | No | No damage was observed | 0.18 |
| Comparison Example 11-1 | 3.5 wt % | No | A little damage was observed | 0.23 |
| Comparison Example 11-2 | 6.7 wt % | No | Remarkable scratch was observed | 0.15 |
| Example 11-2 | 4.8 wt % | No | No damage was observed | 0.17 |
| Example 11-3 | 5.0 wt % | Yes | No damage was observed | 0.15 |
| Example 11-4 | 5.0 wt % | Yes | No damage was observed | 0.14 |

EXPERIMENT 12

Examples 12-1, 12-2, 12-3 and 12-4 and Comparison Examples 12-1, 12-2, 12-3 and 12-4

Tape samples which have only the back coat layer and do not have the magnetic recording film in experiment 12 were made by the following procedure:

STEP(a): A coating material for the back coat layer was prepared by mixing and dispersing of the following materials.

| | |
|---|---|
| (1) Polyurethane (Mw 50,000) | 34.0 parts |
| (2) Nitrocellulose | |
| (2.1) Nitrocellulose having low molecular weight (Index of average molecular weight of 1/16 sec) | 24.5 parts |
| (2.2) Nitrocellulose having high molecular weight (Index of average molecular weight of ½ sec) | 11.6 parts |
| (3) Carbon black | |
| (3.1) Carbon black (a) (Average particle diameter: 0.023 μm) | 85.0 parts |
| (3.2) Carbon black (Average particle diameter: 0.3 μm) | 0.5 parts |
| (4) Abrasive pigment (CoAl$_2$O$_3$) | 4.2 parts |
| (5) Isocyanate hardener | 14.4 parts |
| (6) Stearic acid | 1.0 parts |
| (7) Methyl ethyl ketone | 65.0 parts |
| (8) Toluene | 105.2 parts |
| (9) Cyclohexane | 13.3 parts; |

STEP(b): The coating material for the back coat layer was applied on one face of a 9 μm thick polyimide film (150 mm width) to form a back coat layer with use of a test coater type "CR3-250" which is manufactured by YASUI SEIKI CO., LTD. JAPAN. The test coater utilizes the gravure coating process shown in FIG. 2. In the test coater, a gravure roll of oblique line type precision roll having 180 mesh (#180) was used, and the temperature for drying was kept at 120° C. constantly. Pressure of the blade was measured by a conventional spring scale. Some process conditions for applying were changed in each examples and comparison examples as shown in Table 15; and STEP (c): The applied film was slit to give tape samples (8 mm width × 3m length).

The following evaluation tests were made on different tape samples obtained in the foregoing examples.

Thickness of the Back Coat Layer

Thickness of the back coat layer was measured by a conventional measuring machine.

Surface Roughness of the Back Coat Layer

Surface roughness of the back coat layer was measured by the non-contact type three dimensional surface roughness meter "Type TOPO-3D". The result of measurement was shown in FIGS. 11–18. FIGS. 11, 12, 13, 14, 15, 16, 17 and 18 are enlarged perspective view (with 100× magnification of the back coat layer of respective Example 12-1, Comparison example 12-1, Comparison example 12-2, Example 12-2, Comparison example 12-3, Example 12-3, Comparison example 12-4 and Example 12-4 which were obtained by the surface roughness meter. Measured values of indexes (respective Ra*, Rms* and P–V*) were also shown in Table 15.
* These indexes are defined in JIS (Japanese Industrial Standards K-0611)

Surface roughness of the back coat layer was also observed by an optical microscope with 200× magnification.

TABLE 15

| Sample No. | Pressure of the blade (gf) | Depth of the gravure roll (μm) | Tape speed (m/min) | Rotation speed of the gravure roll (rpm) | Thickness of the back coat layer (μm) | Ra (nm) | Rms (nm) | P-V (nm) |
|---|---|---|---|---|---|---|---|---|
| Example 12-1 | 0.5 | 450 | 5.0 | 100 | 0.6 | 17.1 | 22.1 | 220 |
| Comparison Example 12-1 | 0.3 | 300 | 6.0 | 105 | 0.3 | 20.3 | 26.8 | 261 |
| Comparison Example 12-2 | 1.2 | 600 | 5.5 | 110 | 0.8 | 15.8 | 20.8 | 273 |
| Example 12-2 | 0.5 | 350 | 4.5 | 200 | 0.4 | 15.6 | 20.3 | 209 |
| Comparison Example 12-3 | 0.8 | 200 | 5.0 | 100 | 0.15 | 16.8 | 22.3 | 245 |
| Example 12-3 | 0.5 | 450 | 4.5 | 70 | 0.7 | 13.2 | 17.1 | 156 |
| Comparison Example 12-4 | 3.0 | 600 | 5.0 | 100 | 0.9 | 15.4 | 19.4 | 179 |
| Example 12-4 | 0.5 | 450 | 4.0 | 60 | 0.6 | 16.8 | 21.1 | 208 |

From the data shown in Table 15 and FIGS. 11–18, the following conclusion was obtained:

The Examples 12-1, 12-2, 13-3 and 12-4 were made under the following condition:
the immersing depth of the roll was below 450 μm,
the tape speed was in the range of from 4.5 m/min to 5 m/min; and
the rotating speed of the roll was in the range of from 65 rpm to 105 rpm.

These Examples showed no transcription of the gravure roll and shared a uniformity of coating on the back layer surface. Thus, a relatively uniform-finished surface was obtained.

The values of Ra, Rms and P–V of each of the Examples were studied comparatively; the Example 12-3 which was made under the following condition: immersing depth of the roll was below 450 μm, the tape speed was 4.5 m/min and the rotation speed of the roll was 70 rpm showed the smallest values indicative of surface roughness. Additionally, from the results of observation of the back coat layer surface of the Example 12-3 through the optical microscope, improved smoothness thereof were confirmed.

Thus, when the back coat layer was formed under the above-mentioned conditions, an improved magnetic recording medium, which has no undesirable transcription onto the magnetic recording film surface, was obtained.

EXPERIMENT 13

Examples 13-1, 13-2 and 13-3

Figure 19:
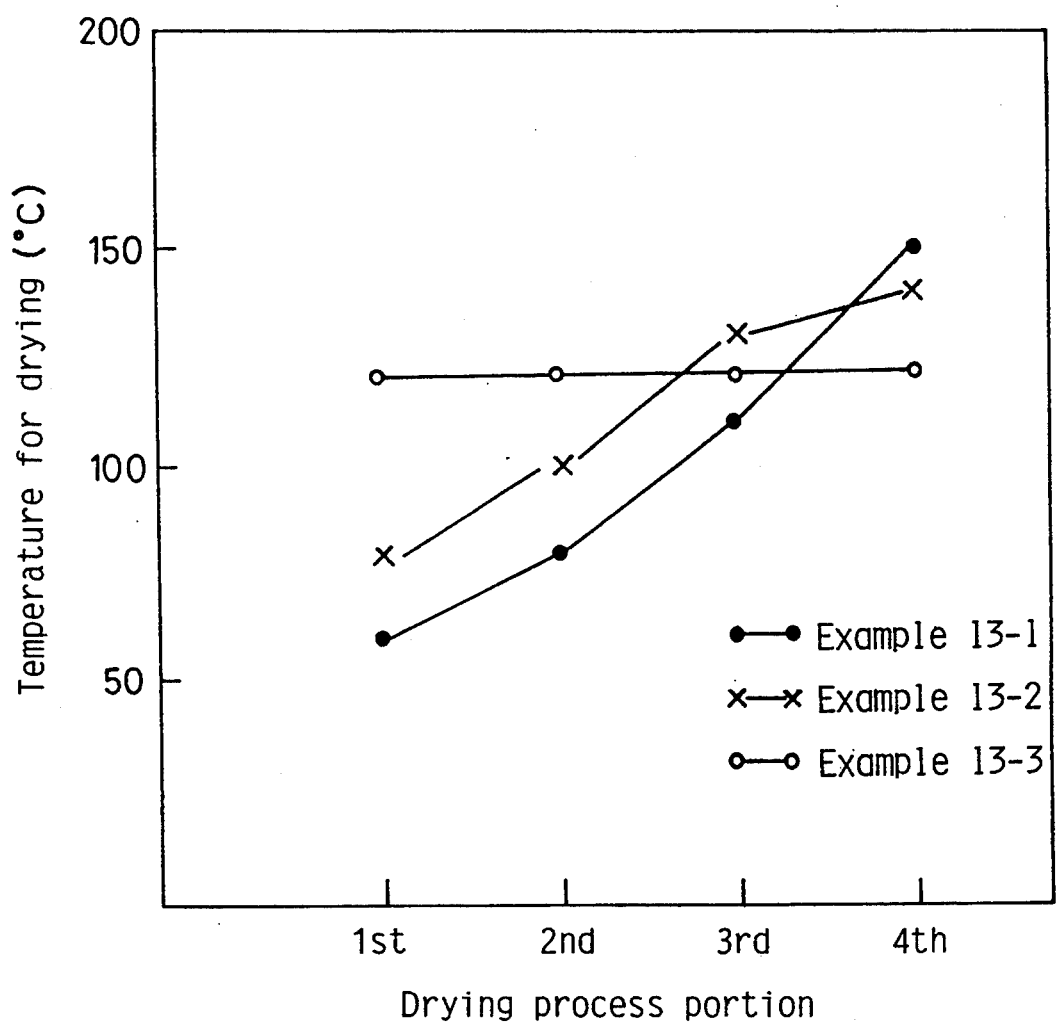
FIG. 19 is a graph showing temperature in respective portions of the drying room as to respective Examples 13-1, 13-2 and 13-3.

In this experiment 13, tape samples which have only the back coat layer and do not have the magnetic recording film were made by the same way as Example 12-3 except that: in STEP(b) the temperature for drying was changed in respective examples as shown in FIG. 19. The temperature for drying can be controlled by utilizing the gradual drying process shown in FIG. 2. As mentioned above, the drying process was carried out in four continuous portions (i.e. a first portion 11, a second portion 12, a third portion 13 and a fourth portion 14) in FIG. 2. In the actual apparatus for drying, there was no actual wall or the like for dividing these portions, but in each portion, a set of a heater and a controller (including an electric thermometer) therefor was used in order to keep a constant temperature in that portion. The set of a heater and a controller is not shown in FIG. 2. Control of temperature for drying is made by setting temperature in each of the portions. The objective temperature in each four portions of respective Examples 13-1, 13-2 and 13-3 was shown in FIG. 19. That is, in Examples 13-1 and 13-2, respective temperatures for drying in each portion are set in a manner that temperature becomes gradually high in the regular order of portions.

The evaluation tests which were as same as those of the Experiment 12 were made on different tape samples obtained in the foregoing examples.

Figure 20:
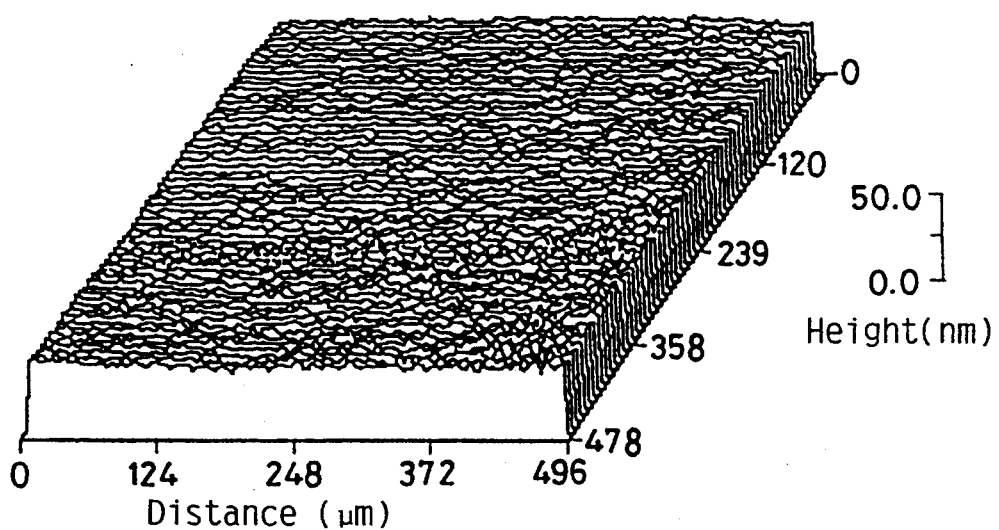
FIGS. 20, 21 and 22 are enlarged perspective views (with 100× magnification) of the back coat layer of respective Examples 13-1, 13-2 and 13-3 which were obtained by a surface roughness meter.
Figure 21:
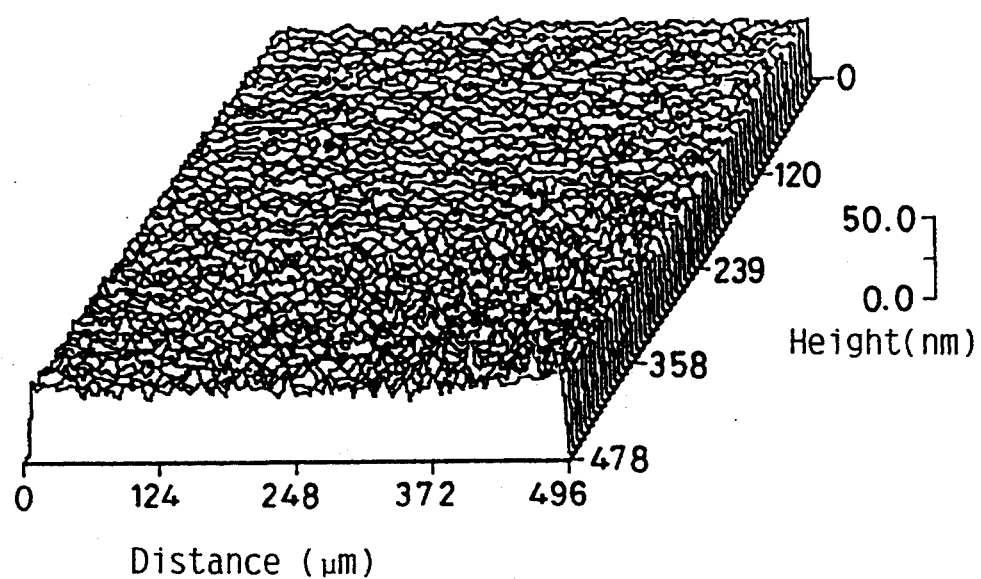
Figure 22:
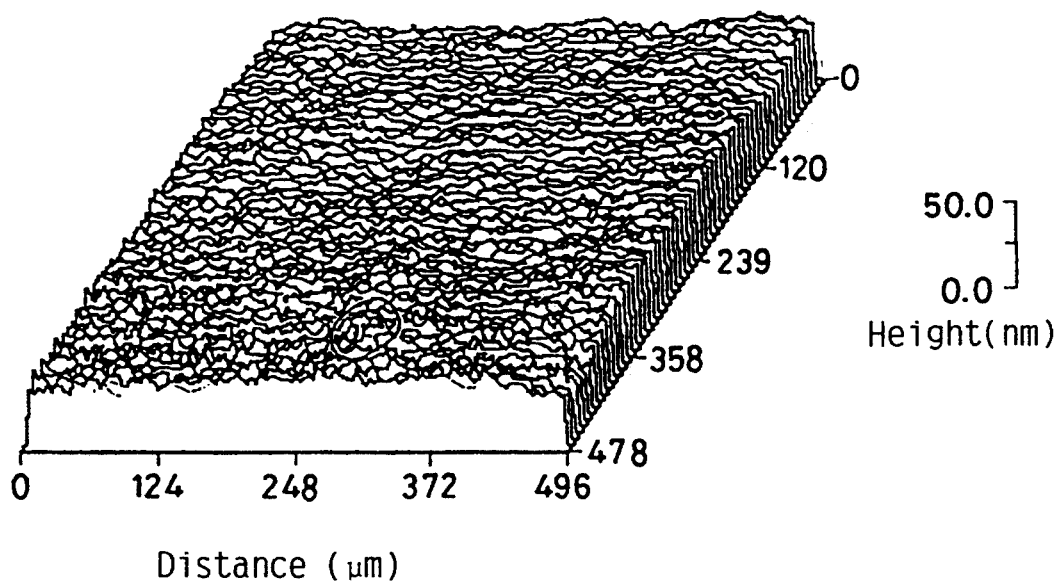

FIGS. 20, 21 and 22 are enlarged perspective views (with 100× magnification) of the back coat layer of respective Examples 13-1, 13-2 and 13-3.

In each case, the temperature for drying was set gradually in the respective four portions from a low temperature about 60° C. to a high temperature about 150° C. as shown by the Example 13-1 in FIG. 19. A more solid back coat layer was obtained as shown in FIG. 20 in comparison with FIGS. 21 and 22. The above-mentioned gradual control of the temperature for drying would mitigate a high evaporation rate of the solvent used in applied coating material.

EXPERIMENT 14

Example 14-1

The Example 14-1 was made by the same procedure as that of Example 1—1 except that: (A) in the STEP(a): a CoCr film was formed as a first magnetic recording layer satisfying specifics shown in the left column of Table 16 and a CoO film was formed as a second magnetic recording layer satisfying specifics shown in the right column of Table 16 on the CoCr film; and (B) in the STEP(c): a 0.6 μm thick back coat layer was formed by the same way as that of Example 13-1.

TABLE 16

|  | CoCr Film | CoO Film |
|---|---|---|
| Temperature of the Substrate | 250° C. | 100° C. |
| Deposition Rate | 800Å/sec | 400Å/sec |
| Incident Angle | 75°–30° | 40°–10° |
| Thickness | 1000Å | 600Å |
| Ratio of Component (Atom) | Co:Cr = 80:20 | Co:O = 50:50 |
| Pressure | $5 \times 10^{-5}$ Torr | $1 \times 10^{-4}$ Torr |

Comparison Example 14-1

The Comparison example 14-1 was made by the same procedure of forming Example 14-1 except that: in the STEP(c): a 0.6 μm thick back coat layer was formed by the same way as Comparison example 12-1.

Thus, in the Comparison example 14-1, the back coat layer was made under a bad condition.

The following evaluation test as to electromagnetic transducing characteristics was made on video tape samples obtained in the foregoing example and comparison example.

Flatness of Envelope

Figure 23A:
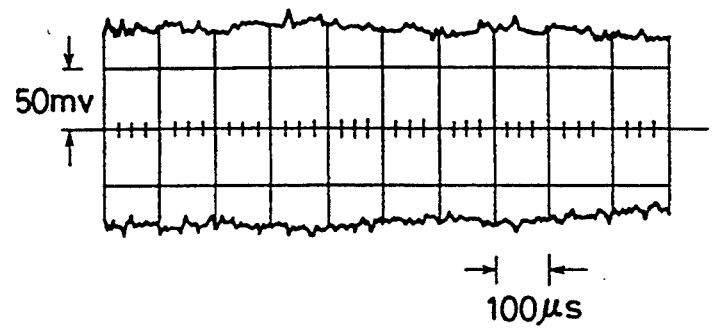
FIG. 23(a) is a wave form of a reproduced signal of Example 14-1 observed on an oscilloscope.
Figure 23B:
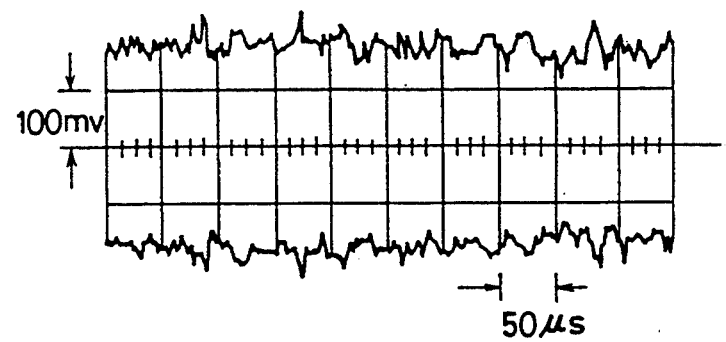
FIG. 23(b) is a wave form of a reproduced signal of Comparison example 14-1 observed on an oscilloscope.

A signal of 7 MHz was recorded on each video tape examples by using the 8 mm system VTR and the wave of the reproduced signal was observed by using an oscilloscope. FIG. 23(a) shows an observed wave form of Example 14-1, and FIG. 23(b) shows that of Comparison example 14-1. From FIGS. 23(a) and 23(b), the flatness of the envelope of the Example 14-1 was more flat than that of the Comparison example 14-1. Thus, the magnetic recording medium having no undesirable transcription and suitable for actual use was obtained.

From results as mentioned above, the back coat layer of the present invention realizes the magnetic recording medium which has the uniform magnetic recording film having wide area and having no transcription of shape.

EXPERIMENT 15

Example 15-1

In the Example 15-1, the back coat layer of the video tape samples was formed by using the same material as that of the Example 8-1. A 0.6μ/mm thick back coat layer was formed under the conditions shown in Table 17. In Table 17, the temperature for drying was set gradually in each portion similar to Example 13-1, and an annealing at 60° C. was carried out for 12 hours after drying in order to accelerate hardening. The magnetic recording film comprises two magnetic layer which is the same as Example 14-1.

Example 15-2

Video tape samples of Example 15-2 were made by the same procedure as that of Example 15-1 except that: the range of the temperature for drying was changed and no annealing was made as shown in Table 17.

Example 15-3

Video tape samples of Example 15-3 were made by the same procedure as that of Example 15-1 except that: the range of the temperature for drying was changed, a condition of annealing was changed and the magnetic recording film consisted of one layer which is as same as the CoO film of the Example 14-1 as shown in Table 17.

Example 15-4

Video tape samples of this Example 15-4 were made by the same procedure as that of the Example 15-1 except that: the range for drying was changed, a condition of annealing was changed and the magnetic recording film consisted of one layer which is as same as the CoCr film of Example 14-1 as shown in Table 17.

Example 15-5

Video tape samples of Example 15-5 were made by the same procedure as that of Example 15-1 except that: the range for drying was changed and no annealing was made as shown In Table 17.

The following evaluation tests were made on different video tape samples obtained in the foregoing examples.

Analysis of Transfer of Component in the Back Coat Layer onto the Magnetic Recording Film A C/Co ratio is defined as a ratio of a mass of C (carbon) which exists on the surface of the magnetic recording film to a mass Or Co(cobalt) which exists on the same. The C/Co ratio was obtained by quantitative analysis of ESCA (electron spectroscopy for chemical analysis) of C and Co which exist on the magnetic recording film. That is, when transfer of component in the back coat layer onto the magnetic recording film occurs, a mass of C which exists on the surface of the magnetic recording film increases so that the C/Co ratio becomes large. The change of the C/Co ratio obtained after coating of the back coat layer in comparison with that obtained before coating is shown in Table 17.

Cylinder Load

The cylinder load was measured in the same way as that of Experiment 3. The results of the measurements are shown in Table 17.

Head Wear

After repeating 50 times of running (in a playback state) of each of the video tape samples by using the same VTR as the Experiment 14, head wear was measured by a touching probe type roughness meter type "ET-30HK" (having a 0.1 μm stylus of sapphire) which is manufactured by KOSAKA LABORATORY CO LTD. JAPAN. The results of the measurements are shown in Table 17.

From the data shown in Table 17, the following conclusion was obtained:

Even when the back coat layer of the present invention was dried from a relatively low temperature, i.e., 80° C., an undesirable transfer of component in the back coat layer onto the magnetic recording film did not occur, and the cylinder load was below 50 mV and the head wear was controlled to be below 60 Å. Thus, a magnetic recording medium having improved runability was obtained.

Although the present invention has been described in terms of the presently preferred embodiments, it is to be understood that such disclosure, is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

TABLE 17

| Sample No. | Temperature for Drying (°C.) | Condition of annealing: Temperature (°C) and period (Hr) | Configuration of the magnetic film | Change of the C/Co ratio | Cylinder load (mV) | Head wear (Å) |
|---|---|---|---|---|---|---|
| Example 15-1 | 80–120 | 60° C. and 12 Hr | CoO/CoCr | No change was observed | 43 | Below 40 |
| Example 15-2 | 110–150 | No annealing was made | Coo/CoCr | No change was observed | 44 | 50–60 |
| Example 15-3 | 80–100 | 80° C. and 10 Hr | CoO | Increment of 15 was observed | 42 | 20–30 |
| Example 15-4 | 90–110 | 100° C. and 5 Hr | CoCr | No change was observed | 50 | 30–40 |
| Example 15-5 | 90–150 | No annealing was made | CoCr | No change was observed | 55 | Below 10 |

What is claimed is:

1. A magnetic recording medium comprising:
   a non-magnetic substrate;
   a magnetic recording film formed on one face of said non-magnetic substrate, said magnetic recording film comprising one member selected from the group consisting of an alloy of the Co, Ni, Fe, an alloy of Co, Ni or Fe with Cr, Mn, Ti, P, Y, Sm or Bi, and an alloy of Co, Ni or Fe with oxides of the same metal;
   a back coat layer formed on a face of said non-magnetic substrate opposite to said face on which said magnetic recording film is formed, said back coat layer comprising
   a polyurethane having a Tg (glass-transition temperature) of about 10° C. and a weight average molecular weight of from 45,000 to 52,000,
   isocyanate hardener having three isocyanate groups,
   carbon powder comprising at least a first carbon powder having an average particle diameter above 0.3 $\mu$m and a second carbon power having an average particle diameter of about 0.02 $\mu$m,
   inorganic abrasive pigment including alumina powder, which is an amorphous mixture of alumina and CoO, and which has an average particle diameter of about 0.5 $\mu$m, and
   nitrocellulose substantially comprising only two nitrocellulose, a first nitrocellulose having a first viscosity molecular weight and a second nitrocellulose having a second viscosity molecular weight larger than said first viscosity molecular weight.

2. A magnetic recording medium in accordance with claim 1, wherein;
   said polyurethane includes minor amounts of a second polyurethane having a Tg above 60° C. and having a polymerization degree of 80000.

3. A magnetic recording medium in accordance with claim 1, said back coat layer further comprising:
   a lubricant of more than 1% by weight as a coating material for said back coat layer.

4. A magnetic recording medium in accordance with claim 1, said carbon powder further comprising:
   a third carbon powder having an average particle diameter in the range of 0.09 $\mu$m to 0.25 $\mu$m.

5. A magnetic recording medium in accordance with claim 1, said carbon powder further comprising:
   a third carbon powder having an average particle diameter in the range of 0.15 $\mu$m to 1.0 $\mu$m.

6. A magnetic recording medium in accordance with claim 1, wherein said back coat layer has a thickness above 0.15 $\mu$m.

* * * * *